(12) United States Patent
Sato et al.

(10) Patent No.: US 10,717,292 B2
(45) Date of Patent: Jul. 21, 2020

(54) INKJET RECORDING METHOD

(71) Applicant: KAO CORPORATION, Tokyo (JP)

(72) Inventors: Takahiro Sato, Wakayama (JP);
Kazuki Watanabe, Wakayama (JP);
Masayuki Narita, Ichikawa (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/765,969

(22) PCT Filed: Sep. 30, 2016

(86) PCT No.: PCT/JP2016/079181
§ 371 (c)(1),
(2) Date: Apr. 4, 2018

(87) PCT Pub. No.: WO2017/061340
PCT Pub. Date: Apr. 13, 2017

(65) Prior Publication Data
US 2018/0311968 A1 Nov. 1, 2018

(30) Foreign Application Priority Data
Oct. 7, 2015 (JP) .................................. 2015-199763

(51) Int. Cl.
*C09D 11/322* (2014.01)
*C09C 1/36* (2006.01)
(Continued)

(52) U.S. Cl.
CPC . B41J 2/18 (2013.01); B41J 2/17 (2013.01); B41M 5/00 (2013.01); C01G 23/047 (2013.01);
(Continued)

(58) Field of Classification Search
CPC ............................. C09D 11/30; C09D 11/322
See application file for complete search history.

(56) References Cited

U.S. PATENT DOCUMENTS 8,784,549 B2* 7/2014 Bermel ............... C09D 11/322
106/31.6
9,133,358 B2* 9/2015 Kasperchik .......... C09D 11/322
(Continued)

FOREIGN PATENT DOCUMENTS

JP   60-123564 A   7/1985
JP   4-1276 A      1/1992
(Continued)

OTHER PUBLICATIONS

English translation of JP 2013/022616, dated Feb. 2013; 16 pages.*
(Continued)

*Primary Examiner* — Helene Klemanski
(74) *Attorney, Agent, or Firm* — Birch, Stewart, Kolasch & Birch, LLP

(57) ABSTRACT

The present invention relates to an ink-jet printing method using a water-based ink containing a rutile-type titanium oxide and a polymer dispersant, in which the polymer dispersant contains a constitutional unit derived from an anionic group-containing monomer selected from the group consisting of acrylic acid, methacrylic acid and the like in an amount of not less than 72% by mass; Mw of the polymer dispersant is from 3,000 to 50,000; and a content of the polymer dispersant in the water-based ink is from 1 to 7% by mass on the basis of the titanium oxide, said method including the step 1 of redispersing the water-based ink by a dispersing means and the step 2 of printing characters or images on a printing medium using the redispersed water-based ink. According to the ink-jet printing method of the present invention, even though the titanium oxide is precipitated, it is possible to readily redisperse the titanium oxide in the water-based ink by simple stirring operations, and further by using the water-based ink whose properties can be rapidly restored owing to excellent foam suppressing (Continued)

properties and defoaming properties thereof, it is possible to attain good ejection properties of the ink.

17 Claims, 1 Drawing Sheet

(51) Int. Cl.
    *C01G 23/047*     (2006.01)
    *B41J 2/18*     (2006.01)
    *B41M 5/00*     (2006.01)
    *C09D 11/30*     (2014.01)
    *B41J 2/17*     (2006.01)
    *C09D 11/00*     (2014.01)

(52) U.S. Cl.
    CPC ............ *C09C 1/3607* (2013.01); *C09D 11/00* (2013.01); *C09D 11/30* (2013.01); *C09D 11/322* (2013.01); *B41J 2202/12* (2013.01); *C01P 2004/60* (2013.01); *C01P 2006/22* (2013.01)

(56) References Cited

U.S. PATENT DOCUMENTS

| | | | |
|---|---|---|---|
| 2001/0007231 A1 | 7/2001 | Kostelnik et al. | |
| 2003/0052952 A1* | 3/2003 | Tanabe | C09C 1/3661 347/100 |
| 2008/0131614 A1* | 6/2008 | Oriakhi | C09D 11/322 427/466 |
| 2008/0314292 A1 | 12/2008 | Shimanaka et al. | |
| 2012/0079960 A1 | 4/2012 | Okuda et al. | |
| 2012/0188305 A1 | 7/2012 | Shiono | |
| 2013/0135382 A1 | 5/2013 | Mitsuzawa et al. | |
| 2013/0249996 A1* | 9/2013 | Saito | C09D 1/00 347/21 |
| 2014/0287206 A1 | 9/2014 | Sasada et al. | |
| 2015/0376425 A1 | 12/2015 | Hakiri et al. | |
| 2018/0187031 A1* | 7/2018 | Teramoto | B41J 2/175 |

FOREIGN PATENT DOCUMENTS

| | | | |
|---|---|---|---|
| JP | 2001-105719 A | | 4/2001 |
| JP | 2002-513819 A | | 5/2002 |
| JP | 2003-105223 A | | 4/2003 |
| JP | 2009-24165 A | | 2/2009 |
| JP | 2010-511747 A | | 4/2010 |
| JP | 2011-121344 A | | 6/2011 |
| JP | 2012-16824 A | | 1/2012 |
| JP | 2013/022616 A | * | 2/2013 |
| JP | 2013-194122 A | | 9/2013 |
| JP | 2014-43492 A | | 3/2014 |
| JP | 2014-177569 A | | 9/2014 |
| JP | 2014-185235 A | | 10/2014 |
| JP | 2014-210837 A | | 11/2014 |
| JP | 2015-83684 A | | 4/2015 |

OTHER PUBLICATIONS

International Search Report for PCT/JP2016/079181 (PCT/ISA/210) dated Dec. 6, 2016.

Extended European Search Report, dated May 7, 2019, for European Application No. 16853494.9.

* cited by examiner

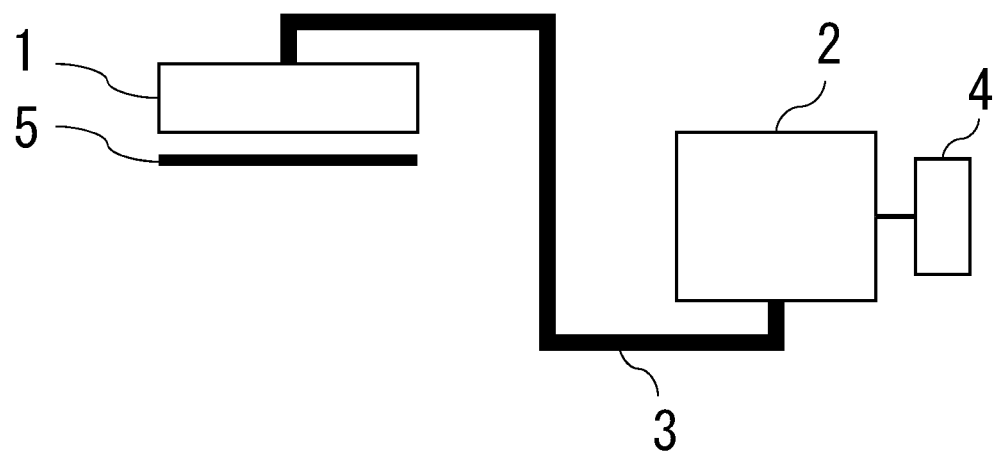

INKJET RECORDING METHOD

FIELD OF THE INVENTION

The present invention relates to an ink-jet printing method and a water-based ink for ink-jet printing.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods need no printing plate unlike the conventional printing methods. Therefore, it has been expected that the ink-jet printing methods can be used in extensive applications as on-demand printing methods that are adaptable for production of a small number and various kinds of prints. In particular, in recent years, there is an increasing demand for not only printed materials using a conventional printing medium having a white ground, such as a plain paper, but also printed materials using a printing medium having a non-white ground, such as a corrugated board, a paper board, a resin film, etc.

When producing printed materials using the printing medium having a non-white ground, a white ink is used for the purpose of expressing images with a white color or enhancing visibility of the images. As a pigment of the white ink, titanium oxide that is an inorganic pigment having a high hiding power has been frequently used.

In addition, for the purpose of improving dispersibility of the titanium oxide in the ink, a pigment dispersant has been used.

For example, JP 60-123564A (Patent Literature 1) discloses an aqueous pigment dispersion constituted of a polymer dispersant, a pigment such as titanium oxide and an aqueous medium, in which the polymer dispersant serves as a pigment dispersant that is capable of easily dispersing the pigment in an aqueous coating material even when using the dispersant in a small amount and causes no deterioration in coating performance of the aqueous coating material, and is produced by copolymerizing monomers including 3 to 98 parts by weight of a mono- or polyalkylene glycol-modified (meth)acrylic acid-based monomer, 2 to 97 parts by weight of an ethylenically unsaturated nitrogen-containing monomer and 0 to 20 parts by weight of an ethylenically unsaturated carboxylic acid.

JP 2009-24165A (Patent Literature 2) discloses a pigment dispersant that is constituted of 5 to 30% by mass of an aromatic or heterocyclic vinyl monomer unit, 10 to 30% by mass of an acid group-containing monomer unit, 40 to 80% by mass of a (meth)acrylic acid ester monomer unit and 5 to 30% by mass of a monomer unit containing a polyalkylene glycol chain having a specific molecular weight or a chain of a monoalkyl ether of the polyalkylene glycol, and has an acid value of 30 to 300 mgKOH/g and a number-average molecular weight of 5,000 to 30,000. In the Patent Literature 2, it is described that titanium oxide is used as a pigment, and a pigment dispersion using the pigment dispersant can be used as a colorant for an aqueous coating material, an aqueous gravure ink, an aqueous ink-jet ink, an aqueous ink for stationeries, etc.

On the other hand, an ink-jet printing apparatus having a mechanism of inhibiting precipitation of titanium oxide in an ink has been developed. For example, JP 2011-121344A (Patent Literature 3) discloses an ink-jet printing apparatus that is equipped with a main tank, a sub tank, an ink supply means and an ink recovery means for the purpose of inhibiting precipitation of the titanium oxide in a white ink containing the titanium oxide as a pigment even after allowing the white ink to stand in the ink tank for a long period of time, and it is also described that by circulating the ink that is present in an ink flow path between the ink supply means and the ink recovery means, it is possible to maintain a concentration of the ink at a constant level.

SUMMARY OF THE INVENTION

The present invention relates to an ink-jet printing method of printing characters or images with a water-based ink containing a rutile-type titanium oxide and a polymer dispersant using an ink-jet printing apparatus, in which the polymer dispersant contains a constitutional unit derived from at least one anionic group-containing monomer selected from the group consisting of acrylic acid, methacrylic acid, maleic acid and a sulfonic group-containing vinyl monomer in an amount of not less than 72% by mass;

a weight-average molecular weight of the polymer dispersant is not less than 3,000 and not more than 50,000;

a content of the polymer dispersant in the water-based ink is not less than 1% by mass and not more than 7% by mass on the basis of the titanium oxide; and the ink-jet printing apparatus is equipped with a dispersing means for dispersing the titanium oxide in the water-based ink, said method including the following steps 1 and 2:

Step 1: redispersing the water-based ink by the dispersing means; and

Step 2: ejecting the water-based ink redispersed in the step 1 onto a printing medium to print characters or images on the printing medium.

BRIEF DESCRIPTION OF THE DRAWING

The FIGURE is a schematic view showing an example of a construction of an ink-jet printing apparatus used in the present invention.

DETAILED DESCRIPTION OF THE INVENTION

In the case where titanium oxide having a high specific gravity is used in an ink for ink-jet printing having a low viscosity, if a flow of the ink in an ink flow path of an ink-jet printing apparatus is temporarily stopped upon interruption of the printing operation, etc., there tends to occur such a problem that the titanium oxide suffers from precipitation or aggregation in the ink flow path.

The pigment dispersants described in the Patent Literatures 1 and 2 are mainly used in a coating material having a high viscosity. Therefore, if the pigment dispersants are used in a water-based ink for ink-jet printing, there tends to occur such a problem that the resulting ink fails to exhibit sufficient redispersibility after the titanium oxide once suffers from precipitation or aggregation.

In addition, in the case where the white ink having poor redispersibility is used in the ink-jet printing apparatus described in the Patent Literature 3, even though circulation of the ink is periodically conducted, there tends to occur the risk of causing clogging of nozzles therein. Besides, when the printing operation is interrupted, it is required that the ink is circulated to prevent precipitation of the ink.

Furthermore, when a shear force is applied to the ink (by circulation, shaking, stirring, etc.) in order to redisperse the ink, there tends to occur such a problem that foaming of the ink is caused, so that the resulting foams of the ink have an adverse influence on a print head and cause deterioration in ejection properties of the ink. For this reason, it has been required to improve redispersibility, foam suppressing properties and defoaming properties of the ink composition itself.

The present invention relates to an ink-jet printing method in which by using a water-based ink that not only exhibits good hiding power and can be readily redispersed by simple stirring operations even when a rutile-type titanium oxide used therein is precipitated, but also is capable of rapidly restoring its ink properties owing to excellent foam suppressing properties and defoaming properties thereof, it is possible to attain good ejection properties of the ink, as well as a water-based ink for ink-jet printing.

Meanwhile, the term "printing" as used in the present invention is a concept that includes printing or typing for printing characters or images, and the term "printed material" as used in the present invention is a concept that includes printed matters or typed materials on which characters or images are printed.

In addition, the term "redispersion" as used in the present invention means that in the case where titanium oxide that has been dispersed in the water-based ink suffers from precipitation or aggregation in the water-based ink for the reason of allowing the ink to stand for a long period of time, etc., the water-based ink is returned again to the condition in which the titanium oxide is well dispersed in the water-based ink.

The present inventors have found that an ink-jet printing method including the step of redispersing a water-based ink containing a rutile-type titanium oxide and a specific pigment dispersant at specific ratios using a dispersing means is capable of solving the aforementioned conventional problems.

That is, the present invention relates to the following aspects [1] and [2].

[1] An ink-jet printing method of printing characters or images with a water-based ink containing a rutile-type titanium oxide and a polymer dispersant using an ink-jet printing apparatus, in which the polymer dispersant contains a constitutional unit derived from at least one anionic group-containing monomer selected from the group consisting of acrylic acid, methacrylic acid, maleic acid and a sulfonic group-containing vinyl monomer in an amount of not less than 72% by mass;

a weight-average molecular weight of the polymer dispersant is not less than 3,000 and not more than 50,000;

a content of the polymer dispersant in the water-based ink is not less than 1% by mass and not more than 7% by mass on the basis of the titanium oxide; and the ink-jet printing apparatus is equipped with a dispersing means for dispersing the titanium oxide in the water-based ink, said method including the following steps 1 and 2:

Step 1: redispersing the water-based ink by the dispersing means; and

Step 2: ejecting the water-based ink redispersed in the step 1 onto a printing medium to print characters or images on the printing medium.

[2] A water-based ink for ink-jet printing containing a rutile-type titanium oxide and a polymer dispersant, in which the polymer dispersant contains a constitutional unit derived from at least one anionic group-containing monomer selected from the group consisting of acrylic acid, meth-acrylic acid, maleic acid and a sulfonic group-containing vinyl monomer in an amount of not less than 72% by mass;

an average primary particle size of the rutile-type titanium oxide is not less than 100 nm and not more than 600 nm;

a weight-average molecular weight of the polymer dispersant is not less than 3,000 and not more than 50,000; and a content of the polymer dispersant in the water-based ink is not less than 1% by mass and not more than 7% by mass on the basis of the titanium oxide.

In accordance with the present invention, it is possible to provide an ink-jet printing method in which by using a water-based ink that not only exhibits good hiding power and can be readily redispersed by simple stirring operations even when a rutile-type titanium oxide used therein is precipitated, but also is capable of rapidly restoring its ink properties owing to excellent foam suppressing properties and defoaming properties thereof, it is possible to attain good ejection properties of the ink, as well as a water-based ink for ink-jet printing.

[Water-Based Ink for Ink-Jet Printing]

The water-based ink for ink-jet printing which is used in the ink-jet printing method according to the present invention (hereinafter also referred to merely as a "water-based ink" or an "ink") contains a rutile-type titanium oxide and a polymer dispersant, in which the polymer dispersant contains a constitutional unit derived from at least one anionic group-containing monomer selected from the group consisting of acrylic acid, methacrylic acid, maleic acid and a sulfonic group-containing vinyl monomer in an amount of not less than 72% by mass;

an average primary particle size of the rutile-type titanium oxide is not less than 100 nm and not more than 600 nm;

a weight-average molecular weight of the polymer dispersant is not less than 3,000 and not more than 50,000; and a content of the polymer dispersant in the water-based ink is not less than 1% by mass and not more than 7% by mass on the basis of the titanium oxide.

Meanwhile, the term "water-based" as used in the present specification means that water has a largest content among components of a dispersing medium contained in the ink.

In the ink-jet printing method according to the present invention, by using a water-based ink that is excellent not only in redispersibility after precipitation or aggregation of a rutile-type titanium oxide contained therein, but also in foam suppressing properties and defoaming properties, it is possible to suppress and eliminate foaming of the ink which is caused when the ink is redispersed, so that the effect of attaining good ejection properties of the ink can be exhibited. The reason why the aforementioned advantageous effects can be attained by the present invention is considered as follows though it is not clearly determined yet.

That is, in the water-based ink used in the present invention in which the rutile-type titanium oxide is used as a pigment for the ink, the polymer dispersant also used therein contains a constitutional unit derived from at least one anionic group-containing monomer selected from the group consisting of acrylic acid, methacrylic acid, maleic acid and a sulfonic group-containing vinyl monomer in an amount of not less than 72% by mass, an average primary particle size of the rutile-type titanium oxide is not less than 100 nm and not more than 600 nm, and a weight-average molecular weight of the polymer dispersant is not less than 3,000 and not more than 50,000.

It is considered that the anionic group of the polymer dispersant not only acts as an absorbing group for allowing the polymer dispersant to absorb on the surface of the titanium oxide, but also can be charged negatively to thereby suppress aggregation or precipitation of the titanium oxide owing to a charge repulsion force acting between the titanium oxide particles. Furthermore, it is considered that since the polymer dispersant contains the constitutional unit derived from the anionic group-containing monomer in an amount of not less than 72% by mass, the polymer dispersant can exhibit a very high effect of suppressing aggregation or precipitation of the titanium oxide owing to the electrical repulsion force acting between the titanium oxide particles. As a result, it is considered that even though the titanium oxide suffers from precipitation or aggregation during printing or upon interruption of the printing, it is possible to readily redisperse the titanium oxide in the ink only by applying a simple mechanical force such as stirring to the ink.

In this case, since the polymer dispersant contains the constitutional unit derived from the anionic group-containing monomer in an amount of not less than 72% by mass, almost the whole amount of the polymer dispersant can act as an absorbing group, and only a less amount of the polymer dispersant remains unabsorbed to the titanium oxide. In addition, since the polymer dispersant has a relatively small weight-average molecular weight, the polymer unabsorbed to the titanium oxide exhibits merely a less thickening effect of the ink. For this reason, it is considered that the increase in viscosity of the solvent of the ink owing to the unabsorbed polymer dispersants can be suppressed, and entrapment of air in the ink can also be suppressed because of a less amount of moieties other than the absorbing group component in the polymer dispersant, so that the resulting ink is excellent not only in foam suppressing properties and deforming properties, but also in the effect of suppressing and eliminating foaming of the ink which tends to be caused when the ink is redispersed. Thus, it is considered that since no foams or merely a reduced amount of foams are present in the water-based ink, occurrence of missing nozzles owing to the foams upon ejection of the ink can be prevented, so that the ink can exhibit good ejection properties.

<Rutile-Type Titanium Oxide>

The water-based ink of the present invention contains a rutile-type titanium oxide. Examples of a crystal structure of titanium oxide includes a rutile type (tetragonal system) structure, an anatase type (tetragonal system) structure and a brookite type (orthorhombic system) structure. Among these crystal structures, from the viewpoint of attaining good stability, hiding power and availability of crystals of the titanium oxide, the rutile-type titanium oxide (hereinafter also referred to merely as "titanium oxide") is used in the present invention.

The titanium oxide may be produced by either a gas phase method or a liquid phase method. From the viewpoint of facilitating production of the titanium oxide having a high crystallinity, the titanium oxide produced by a gas phase method is preferably used.

The titanium oxide may be a non-treated titanium oxide. However, the titanium oxide is preferably a surface-treated titanium oxide from the viewpoint of attaining good dispersibility of the titanium oxide in the water-based ink. Examples of the surface treatment of the titanium oxide include a surface treatment with an inorganic substance such as alumina ($Al_2O_3$) and silica ($SiO_2$), a surface treatment with an organic substance such as a titanium coupling agent, a silane coupling agent and a silicone oil, etc. Among these surface treatments, the surface treatment with an inorganic substance is preferred.

The titanium oxide has a capability of causing degradation of organic substances because of a photocatalytic activity thereof. For this reason, the titanium oxide is not directly dispersed and coated with the polymer dispersant, but from the viewpoint of restraining the photocatalytic activity of the titanium oxide and improving wettability of the titanium oxide when dispersed, it is rather preferred that the respective titanium oxide particles are previously surface-treated with an inorganic oxide such as alumina. Furthermore, from the viewpoint of well controlling an acid or base condition of the surface of the respective titanium oxide particles and improving durability of the titanium oxide, it is more preferred that the titanium oxide is surface-treated with silica in combination with the aforementioned inorganic oxide. From the same viewpoints as described above, the titanium oxide is preferably such a titanium oxide as surface-treated with alumina or with alumina and silica.

Examples of a method for surface-treating the titanium oxide with inorganic substances include a method for surface-treating the titanium oxide with alumina or with alumina and silica, as well as a method for surface-treating the titanium oxide by coating the titanium oxide with an inorganic hydrate containing zinc, magnesium, zirconium, etc.

The titanium oxide particles thus surface-treated are calcined at a temperature of from 800 to 1000° C., whereby it is possible to improve flowability and dispersibility of the titanium oxide particles having a secondary particle size without allowing sintering between the titanium oxide particles to proceed.

The particle shape of the titanium oxide is not particularly limited, and may be a granular shape, an acicular shape, etc. The average primary particle size of the titanium oxide is not less than 100 nm, preferably not less than 150 nm and more preferably not less than 200 nm from the viewpoint of improving whiteness of the resulting ink, and is also not more than 600 nm, preferably not more than 500 nm and more preferably not more than 400 nm from the viewpoint of improving redispersibility of the resulting ink.

Meanwhile, the average primary particle size of the titanium oxide may be measured by the method described in Examples below.

Examples of commercially available products of the rutile-type titanium oxide include "TIPAQUE R" (tradename) series products, "TIPAQUE CR" (tradename) series products and "TIPAQUE PF" (tradename) series products all available from Ishihara Sangyo Kaisha, Ltd., "R" (tradename) series products available from Sakai Chemical Industry Co., Ltd., "JR" (tradename) series products and "MT" (tradename) series products both available from TAYCA Corporation, "KURONOS KR" (tradename) series products available from Titan Kogyo, Ltd., and "TR" (tradename) series products available from Fuji Titanium Industry Co., Ltd., etc.

<Polymer Dispersant>

The water-based ink of the present invention also contains the polymer dispersant (hereinafter also referred to merely as a "dispersant").

The polymer dispersant is in the form of a polymer that contains a constitutional unit derived from at least one anionic group-containing monomer selected from the group consisting of acrylic acid, methacrylic acid, maleic acid and a sulfonic group-containing vinyl monomer in an amount of not less than 72% by mass, and has a weight-average molecular weight of not less than 3,000 and not more than 50,000.

(Anionic Group-Containing Monomer)

The anionic group-containing monomer as the constitutional unit of the polymer dispersant is at least one monomer selected from the group consisting of acrylic acid, methacrylic acid, maleic acid and a sulfonic group-containing vinyl monomer from the viewpoint of improving dispersion stability and ejection stability of the resulting ink. These acids may be present in the form of a salt thereof. Examples of the salts of the acids include a sodium salt and a potassium salt, etc.

As the sulfonic group-containing vinyl monomer, preferred are unsaturated sulfonic acid monomers, and more preferred are styrenesulfonic acid and 2-acrylamido-2-methylpropanesulfonic acid. These acids may be present in the form of a salt thereof. Examples of the salts of the acids include a sodium salt and a potassium salt.

Among these anionic group-containing monomers, preferred is at least one monomer selected from the group consisting of acrylic acid, methacrylic acid, maleic acid and styrenesulfonic acid, and more preferred is at least one monomer selected from the group consisting of acrylic acid, methacrylic acid and styrenesulfonic acid.

Specific examples of the preferred polymer dispersant containing the constitutional unit derived from the anionic group-containing monomer include polyacrylic acid, polymethacrylic acid and a copolymer containing constitutional units derived from methacrylic acid and styrenesulfonic acid.

The content of the constitutional unit derived from the anionic group-containing monomer in the polymer dispersant is preferably not less than 75% by mass, more preferably not less than 80% by mass, even more preferably not less than 85% by mass and further even more preferably not less than 90% by mass from the viewpoint of improving foam suppressing properties and ejection properties of the resulting ink.

The polymer dispersant may be ionized and thereby rendered water-soluble by neutralizing the anionic group of the polymer dispersant, so that it is possible to disperse the titanium oxide in an aqueous medium. Examples of a neutralizing agent used for neutralizing the anionic group of the polymer dispersant include sodium hydroxide, potassium hydroxide and ammonia, etc.

The polymer dispersant used in the present invention may also contain a constitutional unit derived from a nonionic monomer or a constitutional unit derived from a hydrophobic monomer, in addition to the aforementioned constitutional unit derived from the anionic group-containing monomer, unless the advantageous effects of the present invention are adversely affected thereby. The content of the constitutional unit derived from a nonionic monomer or the constitutional unit derived from a hydrophobic monomer in the polymer dispersant is preferably not more than 28% by mass, more preferably not more than 25% by mass, even more preferably not more than 20% by mass, further even more preferably not more than 15% by mass and still further even more preferably not more than 10% by mass.

In this case, from the viewpoint of facilitating production of the polymer dispersant in an aqueous system and suppressing aggregation and precipitation of the water-based ink, the polymer dispersant is preferably in the form of a polymer containing the constitutional unit derived from the anionic group-containing monomer and the constitutional unit derived from the nonionic monomer.

(Nonionic Monomer)

Examples of the nonionic monomer include 2-hydroxyethyl (meth)acrylate, 3-hydroxypropyl (meth)acrylate, polyalkylene glycol (meth)acrylates and alkoxy polyalkylene glycol (meth)acrylates. Among these nonionic monomers, form the viewpoint of improving redispersibility of the resulting ink, preferred are polyalkylene glycol (meth)acrylates.

Meanwhile, the term "(meth)acrylate" as used herein means at least one compound selected from the group consisting of an acrylate and a methacrylate, and the "(meth)acrylate" as described hereinafter is also defined in the same way.

Suitable examples of the constitutional unit derived from the polyalkylene glycol (meth)acrylates include a constitutional unit represented by the following formula (1).

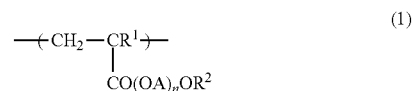

$$-(CH_2-CR^1)-$$
$$\quad\quad\quad |$$
$$\quad\quad CO(OA)_nOR^2$$
(1)

wherein $R^1$ is a hydrogen atom or a methyl group; $R^2$ is a hydrogen atom or an alkyl group having not less than 1 and not more than 20 carbon atoms; OA is an oxyalkylene group having not less than 2 and not more than 4 carbon atoms; and n represents an average molar number of addition of an alkyleneoxide, and is a number of not less than 10 and not more than 100.

In the aforementioned formula (1), the number of carbon atoms in OA as an oxyalkylene group is not less than 2 and not more than 4, preferably not less than 2 and not more than 3, and more preferably 2, from the viewpoint of improving redispersibility of the resulting ink.

Examples of the oxyalkylene group having not less than 2 and not more than 4 carbon atoms include an oxyethylene group, an oxypropylene group and an oxybutylene group. Among these oxyalkylene groups, from the viewpoint of improving redispersibility of the resulting ink, preferred is an oxyethylene group or an oxypropylene group, and more preferred is an oxyethylene group.

In the aforementioned formula (1), from the viewpoint of improving redispersibility of the resulting ink, $R^1$ is a hydrogen atom or a methyl group, and preferably a methyl group.

In the aforementioned formula (1), from the viewpoint of improving redispersibility of the resulting ink, $R^2$ is a hydrogen atom or an alkyl group having not less than 1 and not more than 20 carbon atoms, preferably a hydrogen atom or an alkyl group having not less than 1 and not more than 8 carbon atoms, more preferably a hydrogen atom or an alkyl group having not less than 1 and not more than 3 carbon atoms, and even more preferably a methyl group.

In the aforementioned formula (1), n that represents an average molar number of addition of the alkyleneoxide is preferably a number of not less than 10, more preferably not less than 15 and even more preferably not less than 20, and is also preferably a number of not more than 80, more preferably not more than 60 and even more preferably not more than 40, from the viewpoint of improving redispersibility of the resulting ink.

However, the oxyalkylene groups in the number of n may be the same or different from each other. In addition, when the oxyalkylene groups are different from each other, these oxyalkylene groups may be bonded to each other in any of a block addition form, a random addition form and an alternate addition form.

Examples of the monomer from which the constitutional unit represented by the aforementioned formula (1) is derived include at least one monomer selected from the group consisting of polyethylene glycol mono(meth)acrylate, methoxy polyethylene glycol mono(meth)acrylate, ethoxy polyethylene glycol mono(meth)acrylate, propoxy polyethylene glycol mono(meth)acrylate, butoxy polyethylene glycol mono(meth)acrylate, octoxy polyethylene glycol mono(meth)acrylate and stearoxy polyethylene glycol mono(meth)acrylate. Among these monomers, from the viewpoint of improving redispersibility of the resulting ink, preferred is at least one monomer selected from the group consisting of methoxy polyethylene glycol mono(meth)acrylate, ethoxy polyethylene glycol mono(meth)acrylate and propoxy polyethylene glycol mono(meth)acrylate, and more preferred is methoxy polyethylene glycol mono(meth)acrylate.

The content of the constitutional unit derived from the nonionic monomer in the polymer dispersant is preferably not more than 35% by mass, more preferably not more than 25% by mass, even more preferably not more than 20% by mass and further even more preferably not more than 15% by mass on the basis of a total content of the constitutional unit derived from the anionic group-containing monomer and the constitutional unit derived from the nonionic monomer in the polymer dispersant from the viewpoint of suppressing aggregation and precipitation of the titanium oxide in the resulting water-based ink as well as from the viewpoint of improving foam suppressing properties and ejection properties of the resulting ink.

Specific examples of commercially available products of the nonionic monomer include "NK ESTER M-230G", "NK ESTER M-450G" and "NK ESTER M-900G" all available from Shin-Nakamura Chemical Co., Ltd.; "BLEMMER PME-1000" and "BLEMMER PME-4000" both available from NOF Corporation; and "LIGHT ESTER 041MA" available from Kyoeisha Chemical Co., Ltd., etc.

(Hydrophobic Monomer)

The polymer dispersant may further contain the constitutional unit derived from the hydrophobic monomer unless the advantageous effects of the present invention are adversely affected thereby.

As the hydrophobic monomer, from the viewpoint of facilitating production of the polymer as well as from the viewpoint of improving foam suppressing properties and ejection properties of the resulting ink, there may be mentioned at least one monomer selected from the group consisting of alkyl (meth)acrylates and aromatic group-containing monomers, etc.

The alkyl (meth)acrylates are preferably those alkyl (meth)acrylates containing an alkyl group having 1 to 22 carbon atoms and more preferably 6 to 18 carbon atoms. Examples of the alkyl (meth)acrylates include methyl (meth)acrylate, ethyl (meth)acrylate, (iso)propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which any of the groups expressed by "iso or tertiary" and "iso" is present, and the structure in which any of these groups is not present (i.e., normal).

The aromatic group-containing monomers are preferably in the form of a vinyl monomer containing an aromatic group having 6 to 22 carbon atoms which may contain a substituent group having a hetero atom, and more preferably a styrene-based monomer or an aromatic group-containing (meth)acrylate. In addition, it is also preferable to use the styrene-based monomer and the aromatic group-containing (meth)acrylate in combination with each other.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylate include benzyl (meth)acrylate and phenoxyethyl (meth)acrylate. Among these aromatic group-containing (meth)acrylates, more preferred is benzyl (meth)acrylate.

(Production of Polymer Dispersant)

The polymer dispersant may be produced by copolymerizing a monomer mixture containing the aforementioned monomers by known polymerization methods. Among the polymerization methods, from the viewpoint of well controlling a molecular weight of the resulting polymer, preferred is a solution polymerization method.

The solvent used in the solution polymerization method is not particularly limited, and preferred examples of the solvent include water; aliphatic alcohols having not less than 1 and not more than 3 carbon atoms; ketones having not less than 3 and not more than 8 carbon atoms; esters such as ethyl acetate; and mixed solvents constituted of water and at least one of these organic solvents. From the viewpoint of directly using the solvent as such without removal thereof upon production of the below-mentioned titanium oxide dispersion, among these solvents, more preferred is water.

As the polymerization initiator, any suitable polymerization initiators may be used as long as they can be suitably used in ordinary solution polymerization methods. Among these polymerization initiators, preferred is a persulfate, and more preferred is ammonium persulfate. The polymerization initiator is preferably used in an amount of not less than 0.01 part by mass, more preferably not less than 0.05 part by mass and even more preferably not less than 0.1 part by mass, and is also preferably used in an amount of not more than 5 parts by mass, more preferably not more than 3 parts by mass and even more preferably not more than 2 parts by mass, on the basis of 100 parts by mass of a total amount of the monomers used in the monomer mixture, from the viewpoint of well controlling a molecular weight distribution of the resulting dispersant.

As the chain transfer agent, preferred are mercaptans, and more preferred is 2-mercaptoethanol. The chain transfer agent is preferably used in an amount of not less than 0.1 part by mass, more preferably not less than 0.5 part by mass and even more preferably not less than 0.8 part by mass, and is also preferably used in an amount of not more than 8 parts by mass, more preferably not more than 6 parts by mass and even more preferably not more than 4 parts by mass, on the basis of 100 parts by mass of a total amount of the monomers used in the monomer mixture, from the viewpoint of well controlling a molecular weight distribution of the resulting dispersant.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours.

In the case where a persulfate is used as the polymerization initiator, the polymerization temperature is preferably not lower than 70° C. and more preferably not lower than 75° C. from the viewpoint of improving the reactivity of the polymerization reaction, and is also preferably not higher than 85° C. and more preferably not higher than 83° C. from the viewpoint of well controlling a molecular weight distribution of the resulting dispersant.

The aforementioned polymerization reaction is preferably conducted in a nitrogen gas atmosphere or an atmosphere of an inert gas such as argon.

After completion of the polymerization reaction, the polymer dispersant thus produced may be isolated from the reaction solution by conventionally known methods such as reprecipitation and removal of the solvent by distillation. In addition, the thus obtained polymer dispersant may be subjected to reprecipitation, membrane separation, chromatography, extraction, etc., for removing unreacted monomers, etc., therefrom.

The resulting polymer dispersant contains the constitutional unit derived from the anionic group-containing monomer, and therefore can be ionized and rendered water-soluble by neutralizing the anionic group thereof.

Examples of a neutralizing agent used for neutralizing the anionic group include ammonia; organic amines such as ethylamine, diethylamine, trimethylamine, triethylamine and triethanolamine; and hydroxides of alkali metals such as lithium hydroxide, sodium hydroxide and potassium hydroxide. Among these neutralizing agents, from the viewpoint of improving redispersibility of the resulting ink, preferred are hydroxides of alkali metals, and more preferred is sodium hydroxide. These neutralizing agents may be used alone or in the form of a mixture of any two or more thereof.

The neutralizing agent is preferably used in the form of an aqueous neutralizing agent solution. The concentration of the aqueous neutralizing agent solution is preferably not less than 10% by mass, more preferably not less than 20% by mass and even more preferably not less than 30% by mass, and is also preferably not more than 65% by mass, more preferably not more than 60% by mass and even more preferably not more than 55% by mass, from the viewpoint of fully promoting the neutralization of the anionic group of the polymer dispersant.

The acid value of the polymer dispersant is preferably not less than 350 mgKOH/g, more preferably not less than 450 mgKOH/g, even more preferably not less than 550 mgKOH/g, further even more preferably not less than 650 mgKOH/g and still further even more preferably not less than 720 mgKOH/g, and is also preferably not more than 1000 mgKOH/g, more preferably not more than 900 mgKOH/g, even more preferably not more than 850 mgKOH/g and further even more preferably not more than 800 mgKOH/g, from the viewpoint of improving redispersibility, foam suppressing properties and defoaming properties of the resulting ink.

Meanwhile, the acid value of the polymer dispersant may be measured according to JIS K 0070.

The weight-average molecular weight of the polymer dispersant as measured in terms of a polystyrene is not less than 3,000 and not more than 50,000 from the viewpoint of improving dispersion stability, redispersibility, foam suppressing properties and defoaming properties of the resulting ink. The weight-average molecular weight of the polymer dispersant is preferably not less than 5,000, more preferably not less than 10,000, even more preferably not less than 15,000 and further even more preferably not less than 20,000, and is also preferably not more than 400,000 and more preferably not more than 300,000.

Meanwhile, the weight-average molecular weight of the polymer dispersant may be measured by the method described in Examples below.

As the polymer dispersant, there may also be used commercially available products. Examples of the commercially available products of the polymer dispersant include polyacrylic acid available from Wako Pure Chemical Industries, Ltd., special polycarboxylic acids such as "Poise 520" and "Poise 530" (tradenames) both available from Kao Corporation, and water-soluble acrylic acid-based dispersants "ARON" series products such as "ARON 6012" (tradename) available from TOAGOSEI Co., Ltd.

<Organic Solvent>

The water-based ink of the present invention preferably further contains at least one organic solvent having a boiling point of not lower than 90° C. and lower than 250° C. from the viewpoint of suppressing excessive increase in viscosity of the ink owing to inclusion of the dispersant as well as from the viewpoint of improving redispersibility of the resulting ink.

The boiling point of the organic solvent is preferably not lower than 130° C., more preferably not lower than 135° C. and even more preferably not lower than 138° C., and is also preferably not higher than 245° C., more preferably not higher than 240° C. and even more preferably not higher than 235° C., from the same viewpoints as described above.

Examples of the organic solvent include polyhydric alcohols, glycol ethers, etc.

Examples of the aforementioned polyhydric alcohols include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.), diethylene glycol (b.p. 245° C.), polyethylene glycol, dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.), etc.

Among these polyhydric alcohols, from the same viewpoints as described above, preferred is at least one compound selected from the group consisting of alkanediols having not less than 2 and not more than 6 carbon atoms, such as propylene glycol, diethylene glycol and 1,2-hexanediol, and polypropylene glycols having a molecular weight of 500 to 1000, and more preferred is at least one compound selected from the group consisting of 1,2-alkanediols having not less than 3 and not more than 4 carbon atoms, such as propylene glycol and diethylene glycol, and the aforementioned polypropylene glycols (Glycol Ethers)

Specific examples of the glycol ethers include alkylene glycol monoalkyl ethers and alkylene glycol dialkyl ethers. Among these glycol ethers, from the same viewpoints as described above, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether (b.p. 136° C.), ethylene glycol isopropyl ether (b.p. 144° C.), ethylene glycol propyl ether (b.p. 151° C.), ethylene glycol butyl ether (b.p. 171° C.), diethylene glycol methyl ether (b.p. 194° C.), diethylene glycol ethyl ether (b.p. 202° C.), diethylene glycol isopropyl ether (b.p. 207° C.), diethylene glycol isobutyl ether (b.p. 220° C.), diethylene glycol butyl ether (b.p. 230° C.), triethylene glycol methyl ether (b.p. 248° C.), dipropylene glycol butyl ether (b.p. 231° C.), dipropylene glycol methyl ether (b.p. 189° C.) and tripropylene glycol methyl ether (b.p. 243° C.), etc.

Of these alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of ethylene glycol isopropyl ether, diethylene glycol isopropyl ether and diethylene glycol isobutyl ether.

(Other Organic Solvents)

The water-based ink of the present invention may also contain, in addition to the aforementioned organic solvents, any other organic solvents that may be usually compounded in the water-based ink, such as the other alcohols, alkyl ethers of the alcohols, glycol ethers, nitrogen-containing heterocyclic compounds such as N-methyl-2-pyrrolidone, amides, amines and sulfur-containing compounds.

For example, 1,6-hexanediol (b.p. 250° C.), triethylene glycol (b.p. 285° C.), tripropylene glycol (b.p. 273° C.), polypropylene glycol (b.p. not lower than 250° C.), glycerol (b.p. 290° C.) or the like may be used in combination with any of the compounds having a boiling point of lower than 250° C.

<Surfactant>

The water-based ink of the present invention may further contain a surfactant from the viewpoint of improving redispersibility of the resulting ink.

As the surfactant, from the viewpoint of improving redispersibility of the resulting ink, preferred are those containing a silicone-based surfactant.

The silicone-based surfactant is not particularly limited, and any suitable silicone-based surfactant may be appropriately selected and used according to the objects and applications thereof. Among these silicone-based surfactants, from the viewpoint of suppressing increase in viscosity of the resulting water-based ink, improving continuous ejection properties of the water-based ink and obtaining good printed materials that are free of color migration or intercolor bleeding as well as deformation of a printing medium, a polyether-modified silicone-based surfactant is preferably used.

(Polyether-Modified Silicone-Based Surfactant)

The polyether-modified silicone-based surfactant is capable of suppressing increase in viscosity of the resulting water-based ink and occurrence of intercolor bleeding between the inks. Therefore, it is considered that the polyether-modified silicone-based surfactant contributes to obtaining good printed materials that are free of color migration or intercolor bleeding even when used in high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or in a random form. More specifically, as the polyether-modified silicone-based surfactant, there may be used a compound formed by grafting a polyether group to a main chain of a silicone, a compound formed by bonding a silicone and a polyether group to each other in a block form, etc.

The HLB value of the polyether-modified silicone-based surfactant is preferably not less than 3.0, more preferably not less than 4.0 and even more preferably not less than 4.5 from the viewpoint of improving solubility of the polyether-modified silicone-based surfactant in the water-based ink. The term "HLB" value as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

$$HLB=20\times[(\text{molecular weight of hydrophilic group contained in surfactant})/(\text{molecular weight of surfactant})]$$

Specific examples of the polyether-modified silicone-based surfactant include "KF" series products available from Shin-Etsu Chemical Co., Ltd.; "SILFACE SAG 005" available from Nissin Chemical Co., Ltd.; and "BYK-348" available from BYK Chemie Japan K.K., etc.

(Other Surfactants)

In the present invention, as the surfactant, the surfactant other than the polyether-modified silicone-based surfactant may be used in combination therewith. Among the surfactants other than the polyether-modified silicone-based surfactants, from the viewpoint of attaining good applicability to the water-based ink, preferred is a nonionic surfactant.

Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having 8 to 22 carbon atoms, a polyhydric alcohol or an aromatic alcohol, (2) esters of a higher alcohol containing a saturated or unsaturated, linear or branched hydrocarbon group having 8 to 22 carbon atoms, and a polyvalent fatty acid, (3) polyoxyalkylene aliphatic amines containing a linear or branched alkyl group or alkenyl group having 8 to 20 carbon atoms, and (4) ester compounds of a higher fatty acid having 8 to 22 carbon atoms and a polyhydric alcohol, or compounds produced by adding an alkyleneoxide to the ester compounds.

Examples of commercially available products of the nonionic surfactant include "SURFYNOL" series products available from Nissin Chemical Co., Ltd., and Air Products & Chemicals, Inc., "ACETYLENOL" series products available from Kawaken Fine Chemicals Co., Ltd., and "EMULGEN 120" (polyoxyethylene lauryl ether) available from Kao Corporation, etc.

[Other Components]

The water-based ink of the present invention may also contain, in addition to the rutile-type titanium oxide and the polymer dispersant, the other components that may be usually used in the water-based ink, such as an organic solvent, a surfactant and various ordinary additives such as a wetting agent, a penetrant, a dispersant, a viscosity controller, a defoaming agent, a mildew-proof agent, a rust preventive and an ultraviolet absorber, if required.

[Process for Producing Water-Based Ink for Ink-Jet Printing]

The water-based ink of the present invention which contains the rutile-type titanium oxide and the polymer dispersant may be produced by the method in which the rutile-type titanium oxide and the polymer dispersant are previously mixed to prepare a titanium oxide dispersion, and then the thus prepared titanium oxide dispersion are mixed with water and, if required, various additives, followed by stirring the obtained mixture.

(Titanium Oxide Dispersion)

The method of preparing the titanium oxide dispersion used in the present invention is not particularly limited. From the viewpoint of improving redispersibility of the resulting ink, the titanium oxide dispersion is preferably prepared by dispersing a mixture obtained by mixing the rutile-type titanium oxide, the polymer dispersant and water and, if required, the other additives, using a disperser.

The titanium oxide dispersion may be prepared by dispersing the aforementioned mixture only one time. However, from the viewpoint of obtaining a uniform dispersion, the titanium oxide dispersion may be prepared by first subjecting the aforementioned mixture to preliminary dispersion treatment and then to substantial dispersion treatment.

The disperser that may be used in the aforementioned dispersion treatment is not particularly limited. Examples of the disperser include a kneading mixer such as kneaders; a media-type disperser such as an attritor, a ball mill and a sand mill using glass beads or zirconia beads, etc.; a colloid mill; and the like.

The temperature used in the dispersion treatment is preferably not lower than 10° C., more preferably not lower than 15° C. and even more preferably not lower than 18° C., and is also preferably not higher than 35° C., more preferably not higher than 30° C. and even more preferably not higher than 27° C., from the viewpoint of reducing viscosity of the titanium oxide dispersion.

The dispersing time is preferably not less than 1 hour, more preferably not less than 2 hours and even more preferably not less than 3 hours, and is also preferably not more than 100 hours, more preferably not more than 50 hours and even more preferably not more than 25 hours, from the viewpoint of fully atomizing the titanium oxide.

The content of the rutile-type titanium oxide in the titanium oxide dispersion is preferably not less than 10% by mass, more preferably not less than 20% by mass, even more preferably not less than 30% by mass and further even more preferably not less than 40% by mass, and is also preferably not more than 80% by mass, more preferably not more than 70% by mass, even more preferably not more than 60% by mass and further even more preferably not more than 55% by mass, from the viewpoint of improving dispersion stability of the titanium oxide dispersion.

The content of the polymer dispersant in the titanium oxide dispersion is preferably not less than 0.5 part by mass, more preferably not less than 1.0 part by mass, even more preferably not less than 1.3 parts by mass and further even more preferably not less than 1.8 parts by mass, and is also preferably not more than 7 parts by mass, more preferably not more than 6.5 parts by mass, even more preferably not more than 6.0 parts by mass, further even more preferably not more than 5.5 parts by mass, still further even more preferably not more than 4.0 parts by mass and still further even more preferably not more than 3.0 parts by mass, on the basis of 100 parts by mass of the rutile-type titanium oxide, from the viewpoint of improving dispersion stability, foam suppressing properties and defoaming properties of the titanium oxide dispersion.

The titanium oxide dispersion contains particles of the titanium oxide which are dispersed therein with the polymer dispersant. The average particle size of the particles in the titanium oxide dispersion is preferably not less than 150 nm, more preferably not less than 240 nm and even more preferably not less than 290 nm, and is also preferably not more than 1000 nm, more preferably not more than 500 nm, even more preferably not more than 350 nm and further even more preferably not more than 330 nm, from the viewpoint of improving dispersion stability, foam suppressing properties and defoaming properties of the titanium oxide dispersion. Meanwhile, the average particle size of the particles in the titanium oxide dispersion may be measured by the method described in Examples below.

(Contents of Respective Components in Water-Based Ink)

The contents of the respective components in the water-based ink used in the present invention as well as various properties of the water-based ink are as follows from the viewpoint of improving redispersibility, foam suppressing properties, deforming properties and hiding power, etc., of the resulting water-based ink.

The content of the rutile-type titanium oxide in the water-based ink is preferably not less than 3.0% by mass, more preferably not less than 5.0% by mass and even more preferably not less than 8.0% by mass from the viewpoint of improving hiding power of the water-based ink, and is also preferably not more than 20% by mass, more preferably not more than 17% by mass and even more preferably not more than 15% by mass from the viewpoint of improving ejection properties of the water-based ink.

The content of the polymer dispersant in the water-based ink is not less than 1% by mass, preferably not less than 1.3% by mass and more preferably not less than 1.8% by mass, and is also not more than 7% by mass, preferably not more than 6.5% by mass, more preferably not more than 6.0% by mass, even more preferably not more than 5.5% by mass, further even more preferably not more than 4.0% by mass and still further even more preferably not more than 3.0% by mass, on the basis of the titanium oxide, from the viewpoint of improving redispersibility, foam suppressing properties and deforming properties of the resulting water-based ink.

The content of the aforementioned organic solvent in the water-based ink is preferably not more than 45% by mass, more preferably not more than 40% by mass and even more preferably not more than 35% by mass from the viewpoint of improving redispersibility of the resulting water-based ink.

The content of the aforementioned surfactant in the water-based ink is preferably not more than 5.0% by mass, more preferably not more than 3.0% by mass, even more preferably not more than 1.0% by mass and further even more preferably not more than 0.5% by mass from the viewpoint of improving redispersibility of the resulting water-based ink.

The content of water in the water-based ink is preferably not less than 30% by mass, more preferably not less than 40% by mass and even more preferably not less than 50% by mass, and is also preferably not more than 70% by mass and more preferably not more than 60% by mass from the viewpoint of improving redispersibility of the resulting water-based ink.

(Properties of Water-Based Ink)

The viscosity of the water-based ink as measured at 32° C. is preferably not less than 4.0 mPa·s, more preferably not less than 4.5 mPa·s and even more preferably not less than 5.0 mPa·s, and is also preferably not more than 12 mPa·s, more preferably not more than 9.0 mPa·s, even more preferably not more than 7.5 mPa·s and further even more preferably not more than 6.5 mPa·s, from the viewpoint of improving redispersibility of the resulting water-based ink.

Meanwhile, the viscosity at 32° C. of the water-based ink may be measured by the method described in Examples below.

The pH value of the water-based ink is preferably not less than 5.5, more preferably not less than 6.0 and even more preferably not less than 6.5 from the viewpoint of improving redispersibility of the resulting water-based ink, and is also preferably not more than 11.0, more preferably not more than 10.0, even more preferably not more than 9.5 and further even more preferably not more than 9.0 from the viewpoint of improving the resistance of members to the ink and suppressing skin irritation.

[Ink-Jet Printing Method]

The ink-jet printing method of the present invention is an ink-jet printing method of printing characters or images with the aforementioned water-based ink containing the rutile-type titanium oxide and the polymer dispersant using an ink-jet printing apparatus, in which the ink-jet printing apparatus is equipped with a dispersing means for dispersing the titanium oxide in the water-based ink, said method including the following steps 1 and 2:

Step 1: redispersing the water-based ink by the dispersing means; and

Step 2: ejecting the water-based ink redispersed in the step 1 onto a printing medium to print characters or images on the printing medium.

<Step 1>

The step 1 is the step of redispersing the aforementioned water-based ink by the dispersing means.

When using the aforementioned water-based ink in the ink-jet printing method, it is possible to readily redisperse the titanium oxide in the water-based ink by the dispersing means of the aforementioned ink-jet printing apparatus during printing or after interruption of the printing even in the case where the titanium oxide dispersed in the water-based ink suffers from precipitation or aggregation.

The ink-jet printing apparatus used in the present invention includes at least an ink ejection means, a container filled with the aforementioned water-based ink (ink container), an ink flow path and the aforementioned dispersing means for dispersing the titanium oxide contained in the water-based ink. The ink container may further include a preliminary ink container.

The dispersing means may be any suitable dispersing means as long as it is capable of dispersing the titanium oxide in an aqueous medium contained in the water-based ink by applying a mechanical force to the ink. As the dispersing means, there may be mentioned, for example, at least one mechanism selected from the group consisting of a mechanism for stirring the ink in the ink container, a shaking mechanism, a vibration-applying mechanism and a circulating mechanism for circulating the ink.

The FIGURE is a schematic view showing an example of a construction of an ink-jet printing apparatus used in the present invention.

In the FIGURE, the ink-jet printing apparatus includes an ink ejection means 1, an ink container 2, an ink flow path 3 and a stirring mechanism 4 as the dispersing means.

The stirring mechanism 4 is not particularly limited as long as it is capable of stirring the ink within the ink container 2. For example, by operating the stirring mechanism 4, the ink within the ink container 2 is stirred to disperse the titanium oxide therein. As the stirring mechanism 4, there may be mentioned an agitation blade that is rotationally operated by a stirring motor, as well as a stirrer that is rotationally operated by an external magnetic field, etc. The stirring conditions may be suitably adjusted by controlling a temperature, a time interval of stirring operations, a stirring speed, a stirring time, etc.

Examples of the dispersing means other than the aforementioned stirring mechanism include a shaking mechanism, a vibration-applying mechanism and a circulating mechanism for circulating the ink, and the like.

As the aforementioned shaking mechanism, there may be mentioned a mechanism for shaking the ink container by means of a shaking device to disperse the titanium oxide in the ink, etc. The shaking conditions may be suitably adjusted by controlling a temperature, a frequency of shaking operations, a shaking time and the like.

As the vibration-applying mechanism, there may be mentioned a mechanism for applying ultrasonic vibration to the ink container using an ultrasonic vibrator to disperse the titanium oxide in the ink, and the like. The ultrasonic vibration conditions may be suitably adjusted by controlling a temperature, a frequency, an ultrasonic vibration applying time and the like.

As the circulating mechanism, in the case where the ink-jet printing apparatus is further provided with the preliminary ink container, there may be mentioned a mechanism for circulating the ink through the ink flow path between the ink container and the preliminary ink container to disperse the titanium oxide in the ink, etc. The aforementioned circulating mechanism is not particularly limited as long as it is capable of circulating the ink. Examples of the circulating mechanism include a pump, a heat source, etc. Of these circulating mechanisms, from the viewpoint of improving redispersibility of the resulting water-based ink, preferred is a pump.

<Step 2>

The step 2 is the step of ejecting the water-based ink redispersed in the step 1 onto a printing medium to print characters or images on the printing medium.

In the FIGURE, the water-based ink redispersed in the step 1 is ejected by the ink ejection means 1 to print characters or images on the printing medium 5.

As the method of ejecting the water-based ink (ink ejection means), there is preferably used a method of ejecting the ink using a thermal-type print head or a piezoelectric-type print head. In the present invention, there is more preferably used the method in which the container filled with the water-based ink is mounted to the ink-jet printing apparatus, and then the ink is ejected using the piezoelectric-type print head to print characters or images on the printing medium.

By using the water-based ink redispersed in the step 1, the ink can be prevented from suffering from aggregation or precipitation in nozzles of the print head, so that it is possible to obtain good printed materials.

The ink-jet printing method according to the present invention is preferably used for solid image printing such as backing or ground printing, etc., from the viewpoint of utilizing good whiteness of the water-based ink.

The printing medium used in the present invention is not particularly limited. Examples of the printing medium include a corrugated board, a paper board, a resin film, etc. Among these printing media, preferred is a resin film.

Examples of the resin film include a polyester film, a polyvinyl chloride film, a polypropylene film, a polyethylene film and a nylon film. These resin films may be in the form of any of a biaxially stretched film, a monoaxially stretched film and an unstretched film. The resin film is preferably at least one film selected from the group consisting of a polyester film and a stretched polypropylene film, and more preferably a polyester film such as a polyethylene terephthalate film that is subjected to surface treatments such as corona discharge treatment, etc., or a biaxially stretched polypropylene film.

Examples of commercially available products of the transparent synthetic resin films include "LUMIRROR T60" (polyethylene terephthalate) available from Toray Industries, Inc., "TAIKO FE2001" (corona-treated polyethylene terephthalate) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (polypropylene) available from Lintec Corporation and "BONYL RX" (nylon) available from KOHJIN Film & Chemicals Co., Ltd., etc.

With respect to the aforementioned embodiments, the present invention further provides the following aspects relating to the water-based ink and the ink-jet printing method.

<1> An ink-jet printing method of printing characters or images with a water-based ink containing a rutile-type titanium oxide and a polymer dispersant using an ink-jet printing apparatus, in which the polymer dispersant contains a constitutional unit derived from at least one anionic group-containing monomer selected from the group consisting of acrylic acid, methacrylic acid, maleic acid and a sulfonic group-containing vinyl monomer in an amount of not less than 72% by mass;

a weight-average molecular weight of the polymer dispersant is not less than 3,000 and not more than 50,000;

a content of the polymer dispersant in the water-based ink is not less than 1% by mass and not more than 7% by mass on the basis of the titanium oxide; and the ink-jet printing apparatus is equipped with a dispersing means for dispersing the titanium oxide in the water-based ink, said method including the following steps 1 and 2:

Step 1: redispersing the water-based ink by the dispersing means; and

Step 2: ejecting the water-based ink redispersed in the step 1 onto a printing medium to print characters or images on the printing medium.

<2> The ink-jet printing method according to the aspect <1>, wherein the titanium oxide is preferably a surface-treated titanium oxide, and more preferably a titanium oxide that is surface-treated with alumina or with alumina and silica.

<3> The ink-jet printing method according to the aspect <1> or <2>, wherein an average primary particle size of the titanium oxide is preferably not less than 100 nm, more preferably not less than 150 nm and even more preferably not less than 200 nm, and is also preferably not more than 600 nm, more preferably not more than 500 nm and even more preferably not more than 400 nm.

<4> The ink-jet printing method according to any one of the aspects <1> to <3>, wherein the anionic group-containing monomer is preferably at least one monomer selected from the group consisting of acrylic acid, methacrylic acid, maleic acid and styrenesulfonic acid, and more preferably at least one monomer selected from the group consisting of acrylic acid, methacrylic acid and styrenesulfonic acid.

<5> The ink-jet printing method according to any one of the aspects <1> to <4>, wherein a content of the constitutional unit derived from the anionic group-containing monomer in the polymer dispersant is preferably not less than 75% by mass, more preferably not less than 80% by mass, even more preferably not less than 85% by mass and further even more preferably not less than 90% by mass.

<6> The ink-jet printing method according to any one of the aspects <1> to <5>, wherein a content of a constitutional unit derived from a nonionic monomer or a constitutional unit derived from a hydrophobic monomer other than the constitutional unit derived from the anionic group-containing monomer in the polymer dispersant is preferably not more than 28% by mass, more preferably not more than 25% by mass, even more preferably not more than 20% by mass, further even more preferably not more than 15% by mass and still further even more preferably not more than 10% by mass.

<7> The ink-jet printing method according to any one of the aspects <1> to <6>, wherein an acid value of the polymer dispersant is preferably not less than 350 mgKOH/g, more preferably not less than 450 mgKOH/g, even more preferably not less than 550 mgKOH/g, further even more preferably not less than 650 mgKOH/g and still further even more preferably not less than 720 mgKOH/g, and is also preferably not more than 1000 mgKOH/g, more preferably not more than 900 mgKOH/g, even more preferably not more than 850 mgKOH/g and further even more preferably not more than 800 mgKOH/g.

<8> The ink-jet printing method according to any one of the aspects <1> to <7>, wherein a weight-average molecular weight of the polymer dispersant is preferably not less than 5,000, more preferably not less than 10,000, even more preferably not less than 15,000 and further even more preferably not less than 20,000, and is also preferably not more than 400,000 and more preferably not more than 300,000.

<9> The ink-jet printing method according to any one of the aspects <1> to <8>, wherein a content of the rutile-type titanium oxide in the water-based ink is preferably not less than 3.0% by mass, more preferably not less than 5.0% by mass and even more preferably not less than 8.0% by mass, and is also preferably not more than 20% by mass, more preferably not more than 17% by mass and even more preferably not more than 15% by mass.

<10> The ink-jet printing method according to any one of the aspects <1> to <9>, wherein a content of the polymer dispersant in the water-based ink is preferably not less than 1.3% by mass and more preferably not less than 1.8% by mass, and is also preferably not more than 6.5% by mass, more preferably not more than 6.0% by mass, even more preferably not more than 5.5% by mass, further even more preferably not more than 4.0% by mass and still further even more preferably not more than 3.0% by mass, on the basis of the titanium oxide.

<11> The ink-jet printing method according to any one of the aspects <1> to <10>, wherein a content of an organic solvent in the water-based ink is preferably not more than 45% by mass, more preferably not more than 40% by mass and even more preferably not more than 35% by mass.

<12> The ink-jet printing method according to any one of the aspects <1> to <11>, wherein a content of water in the water-based ink is preferably not less than 30% by mass, more preferably not less than 40% by mass and even more preferably not less than 50% by mass, and is also preferably not more than 70% by mass and more preferably not more than 60% by mass.

<13> The ink-jet printing method according to any one of the aspects <1> to <12>, wherein a viscosity of the water-based ink as measured at 32° C. is preferably not less than 4.0 mPa·s, more preferably not less than 4.5 mPa·s and even more preferably not less than 5.0 mPa·s, and is also preferably not more than 12 mPa·s, more preferably not more than 9.0 mPa·s, even more preferably not more than 7.5 mPa·s and further even more preferably not more than 6.5 mPa·s.

<14> The ink-jet printing method according to any one of the aspects <1> to <13>, wherein a pH value of the water-based ink is preferably not less than 5.5, more preferably not less than 6.0 and even more preferably not less than 6.5, and is also preferably not more than 11.0, more preferably not more than 10.0, even more preferably not more than 9.5 and further even more preferably not more than 9.0.

<15> The ink-jet printing method according to any one of the aspects <1> to <14>, wherein the dispersing means is at least one mechanism selected from the group consisting of a stirring mechanism for stirring the water-based ink within an ink container, a shaking mechanism, a vibration-applying mechanism and a circulating mechanism for circulating the water-based ink.

<16> The ink-jet printing method according to any one of the aspects <1> to <15>, wherein the method of ejecting the water-based ink is preferably a method of ejecting the water-based ink using a thermal-type print head or a piezoelectric-type print head, and more preferably a method of ejecting the water-based ink using a piezoelectric-type print head.

<17> The ink-jet printing method according to any one of the aspects <1> to <16>, wherein the printing medium is preferably a resin film, more preferably at least one film selected from the group consisting of a polyester film and a stretched polypropylene film, and even more preferably a polyester film such as a polyethylene terephthalate film that is subjected to surface treatments such as corona discharge treatment, etc., or a biaxially stretched polypropylene film.

<18> A water-based ink for ink-jet printing containing a rutile-type titanium oxide and a polymer dispersant, in which the polymer dispersant contains a constitutional unit derived from at least one anionic group-containing monomer selected from the group consisting of acrylic acid, methacrylic acid, maleic acid and a sulfonic group-containing vinyl monomer in an amount of not less than 72% by mass;

an average primary particle size of the rutile-type titanium oxide is not less than 100 nm and not more than 600 nm;

a weight-average molecular weight of the polymer dispersant is not less than 3,000 and not more than 50,000; and a content of the polymer dispersant in the water-based ink is not less than 1% by mass and not more than 7% by mass on the basis of the titanium oxide.

<19> A use of the water-based ink for ink-jet printing according to the aspect <18>, for ink-jet printing in which the aforementioned water-based ink is ejected onto a printing medium to print characters or images on the printing medium.

EXAMPLES

In the following Production Examples, Examples and Comparative Examples, the "part(s)" and "%" indicate "part (s) by mass" and "% by mass", respectively, unless otherwise specified.

(1) Measurement of Weight-Average Molecular Weight of Polymer Dispersant

Using a polystyrene as a reference standard substance and further using columns "G4000HXL"+"G2000HXL" available from Tosoh Corporation, the weight-average molecular weight of the polymer dispersant was measured by gel permeation chromatography using tetrahydrofuran (THF) containing 50 mM acetic acid (first class) as an eluent.

(2) Measurement of Acid Value of Polymer Dispersant

The acid value of the polymer dispersant was measured according to JIS K 0070.

(3) Measurement of Solid Content of Water Dispersion

Ten grams (10.0 g) of sodium sulfate dried to constant weight in a desiccator were weighed and charged in a 30 mL polypropylene container (40 mmφ; height: 30 mm), and about 1.0 g of a water dispersion as a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content (%) of the sample was calculated by dividing the mass of the solids by the mass of the water dispersion as the sample initially added.

(4) Measurement of Average Primary Particle Size of Titanium Oxide

The average primary particle size of the titanium oxide was determined by the following method. That is, using a transmission electron microscope "JEM-2100" available form JEOL Ltd., 500 primary particles of the titanium oxide were extracted by image analysis to measure their particle sizes and calculate an average value of the thus measured particles sizes as a number-average particle size thereof. Meanwhile, in the case where the respective titanium oxide particles had a major axis diameter and a minor axis diameter, the average primary particle size of the titanium oxide was calculated by using the major axis diameters thereof.

(5) Measurement of Average Particle Size of Particles in Titanium Oxide Dispersion Using a laser diffraction/scattering particle size distribution measuring apparatus "LA950" available from HORIBA Ltd., the titanium oxide dispersion was irradiated with laser rays for 1 minute under the conditions of a circulating rate of 5 and an ultrasonic wave of 3, and then the particle sizes of the particles in the titanium oxide dispersion were measured assuming that the refractive index of the titanium oxide was 2.75 using the water having a refractive index of 1.333 as a dispersing medium thereof. At this time, the thus measured value of the volume median particle size (D50) of the particles was defined as an average particle size of the particles dispersed in the titanium oxide dispersion. The average particle size of the particles in the titanium oxide dispersion is also referred to as an average particle size of the dispersion or a $TiO_2$ average particle size.

(6) Viscosity of Ink

The viscosity of the water-based ink was measured at 32° C. using an E-type viscometer "TV-25" (equipped with a standard cone rotor (1°34'×R24); rotating speed: 50 rpm) available from Toki Sangyo Co., Ltd.

(Production of Polymer Dispersant)

Production Example 1

(Production of Polymer Dispersion P1)

Two hundred thirty three grams (233 g) of water were charged into a 2 L glass reaction vessel equipped with a dropping funnel, and heated to 80° C. in a nitrogen atmosphere.

Next, in a nitrogen gas atmosphere, three solutions, i.e., a monomer solution containing 47.0 g of methoxy polyethylene glycol monomethacrylate (MPEGMAA; tradename; "NK ESTER M-230G"; average molar number of addition of ethyleneoxide (EO): n=23) available from Shin-Nakamura Chemical Co., Ltd., 70.0 g of sodium styrenesulfonate available from Wako Pure Chemical Industries, Ltd., and 117.0 g of methacrylic acid available from Wako Pure Chemical Industries, Ltd., as a dropping solution 1, 30.0 g of a 15% 2-mercaptoethanol aqueous solution available from TOYOBO Co., Ltd., as a dropping solution 2, and 32.0 g of a 6% ammonium persulfate aqueous solution available from Wako Pure Chemical Industries, Ltd., as a dropping solution 3, were respectively gradually added dropwise at the same time into the reaction vessel over 90 minutes. After completion of the dropwise addition, the resulting mixed solution was aged at 80° C. for 1 hour.

Thereafter, the resulting reaction solution was cooed to 40° C., and then 45.5 g of a 48% NaOH aqueous solution available from Wako Pure Chemical Industries, Ltd., was added thereto to neutralize the solution until reaching a neutralization degree of 50%. Then, water was added to the resulting reaction mixture to adjust a solid content thereof to 40%, thereby obtaining a solution of a polymer dispersant P1. The results are shown in Table 1.

Production Example 2 and Comparative Production Examples 1 to 6

(Production of Polymer Dispersants P2 and P3 to P8)

The same procedure as in Production Example 1 was repeated except that the production conditions were changed as shown in Table 1, thereby obtaining polymer dispersants P2 to P8. The results are shown in Table 1.

Ltd., and the contents of the flask were stirred using an agitation blade (at 300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with a nitrogen gas. In a nitrogen atmosphere, the contents of the reaction vessel were heated to 80° C. while stirring with an agitation blade (at 200 rpm), and then the aforementioned monomer emulsion was charged into a dropping funnel and added dropwise into the reaction vessel over 3 hours to allow the monomer emulsion to react with the contents of the reaction vessel.

Ion-exchanged water was added to the resulting reaction solution to adjust a content of the active ingredient in the reaction solution to 20%, thereby obtaining a pigment-free polymer emulsion EM-1. The average particle size of particles in the thus obtained pigment-free polymer emulsion EM-1 was 100 nm.

Example 1

(1) Production of Titanium Oxide Dispersion

A 250 mL polyethylene bottle was charged with a mixed solution prepared by previously mixing and dissolving 0.3 g of polyacrylic acid (PAA; Mw; 5000) available from Wako Pure Chemical Industries, Ltd., as a polymer dispersant, 0.21 g of a 5N NaOH aqueous solution available from Wako

TABLE 1

| | | Production Examples | | Comparative Production Examples | | | | | |
|---|---|---|---|---|---|---|---|---|---|
| | | 1 | 2 | 1 | 2 | 3 | 4 | 5 | 6 |
| | Polymer dispersant | P1 | P2 | P3 | P4 | P5 | P6 | P7 | P8 |
| Composition upon production (g) | Methacrylic acid (a) | 117.0 | 210.0 | 70.0 | 63.0 | 38.0 | 47.0 | 117.0 | 117.0 |
| | Sodium styrenesulfonate (a) | 70.0 | 0.0 | 93.0 | 0.0 | 61.0 | 93.0 | 70.0 | 70.0 |
| | MPEGMAA (b) | 47.0 | 23.0 | 70.0 | 135.0 | 135.0 | 93.0 | 47.0 | 47.0 |
| | 2-mercaptoethanol aqueous solution | 30.0 | 30.0 | 30.0 | 30.0 | 30.0 | 30.0 | 15.0 | 5.0 |
| | Ammonium persulfate aqueous solution (6% by weight) | 32.0 | 32.0 | 32.0 | 32.0 | 32.0 | 32.0 | 32.0 | 20.0 |
| | 48% NaOH aqueous solution | 45.5 | 102.0 | 15.0 | 30.5 | 6.1 | 4.0 | 45.5 | 45.5 |
| | Water | 655.7 | 721.0 | 616.6 | 547.7 | 608.4 | 603.4 | 650.0 | 644.5 |
| Content of constitutional unit derived from component (a) (%)*[1] | | 77.0 | 90.1 | 70.0 | 31.8 | 42.3 | 60.0 | 77.0 | 79.9 |
| Weight-average molecular weight of polymer | | 27,000 | 24,000 | 25,000 | 30,000 | 20,000 | 28,000 | 60,000 | 90,000 |
| Acid value (KOHmg/g) | | 410 | 585 | 305 | 210 | 180 | 240 | 410 | 410 |
| Neutralization degree (%) | | 50 | 50 | 50 | 50 | 50 | 50 | 50 | 50 |

Note
*[1]Content of constitutional unit derived from anionic group-containing monomer (a) (% by mass)

Production Example 3

(Production of Water Dispersion of Pigment-Free Polymer Emulsion)

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (emulsifier; active ingredient content: 26%) available from Kao Corporation, 96 parts of ion-exchanged water and potassium persulfate available from Wako Pure Chemical Industries, Pure Chemical Industries, Ltd., and 1 g of ion-exchanged water. Next, 15 g of titanium oxide "KURONOS KR-380" (rutile-type; Al/Si treated titanium oxide; average primary particle size: 355 nm (catalog value: 300 to 500 nm)) available from Titan Kogyo Co., Ltd., and 14.3 g of ion-exchanged water were added to the bottle. Then, 369 g of 2 mmϕ zirconia beads were finally added to the bottle, and the contents of the bottle were dispersed using a bench top-type pot mill pedestal available from AS ONE Corporation at 250 rpm for 8 hours. Thereafter, the resulting dispersion was filtered through a mesh filter to remove the zirconia beads from the resulting dispersion, and then water was added to the dispersion to adjust a solid content thereof to a desired value, thereby obtaining a titanium oxide dispersion having an average particle size of 325 nm as shown in Table 2 (solid content: 30% by mass).

(2) Production of Water-Based Ink

By using the thus obtained titanium oxide dispersion (solid content: 30% by mass), the respective components having the following composition were mixed with each other such that the content of the titanium oxide in the resulting water-based ink was 10% by mass. The resulting mixed solution was subjected to filtration through a 25 mL-capacity needleless syringe fitted with a 1.2 μm-mesh filter (acetyl cellulose membrane; outer diameter; 2.5 cm) available from FUJIFILM Corporation to remove coarse particles therefrom, thereby obtaining the water-based ink.

<Composition>

| | |
|---|---|
| Titanium oxide dispersion | 34.2 parts |
| Propylene glycol available from Wako Pure Chemical Industries, Ltd. | 30.0 parts |
| Diethylene glycol monoisobutyl ether available from Wako Pure Chemical Industries, Ltd. | 5.0 parts |
| Polymer emulsion EM-1 produced in Production Example 3 | 5.0 parts |
| Polyether-modified silicone "KF-6011" available from Shin-Etsu Chemical Co., Ltd. | 0.1 part |
| Ion-exchanged water | 25.7 parts |

(3) Evaluation of Hiding Power

The hiding power of the resulting water-based ink was evaluated by the following method. As a result, it was confirmed that the water-based ink printed had an optical density of 0.47 and was therefore able to exhibit sufficient hiding power. The results are shown in Table 2.

<Evaluation of Hiding Power of Water-Based Ink>

The water-based ink was applied onto a corona discharge-treated PET "TAIKO Polyester Film FE2001" available from Futamura Chemical Co, Ltd., using a bar coater No. 2, and dried using a dryer at 60° C. for 10 minutes, thereby obtaining a sample to be measured. The ink-applied OHP film was placed on a black-colored portion of a hiding power chart (JIS accepted product) available from Taiyu Kizai Co., Ltd., such that the printed surface of the OHP film faced upward, and the optical density of the black image printed thereon was measured from above using a spectrophotometer "SpectroEye" available from GretagMacbeth GmbH to thereby evaluate a whiteness of the respective water-based inks by the following method. The respective water-based inks used above were those obtained immediately after production thereof.

If the optical density of the printed black image of the water-based ink was not more than 0.5, the water-based ink had a sufficient hiding power, whereas if the optical density of the printed black image of the water-based ink was more than 0.5, the hiding power of the water-based ink was insufficient.

Comparative Example 1

(1) Production of Titanium Oxide Dispersion

The same procedure as in Example 1 was repeated except that the titanium oxide used was replaced with "KURONOS KA-20" (anatase-type; average primary particle size: 355 nm) available from Titan Kogyo Co., Ltd., and the time of the dispersion treatment using the bench top-type pot mill pedestal was changed to 6 hours, thereby obtaining a titanium oxide dispersion having an average particle size of 315 nm (solid content: 30% by mass).

(2) Production of Water-Based Ink and Evaluation of Hiding Power of Water-Based Ink The water-based ink was produced by the same method as in Example 1. As a result of evaluating a hiding power of the thus obtained water-based ink, it was confirmed that the water-based ink printed had an optical density of 0.58 and was therefore insufficient in hiding power. The results are shown Table 2.

TABLE 2

| Kind of titanium oxide | | Average particle size of titanium oxide dispersion | Optical density of printed black image in evaluation test of hiding power |
|---|---|---|---|
| Example 1 | KURONOS KR-380 Rutile-type | 325 nm | 0.47 |
| Comparative Example 1 | KURONOS KA-20 Anatase-type | 315 nm | 0.58 |

Example 2

(1) Production of Titanium Oxide Dispersion and Evaluation of Foaming Properties of Titanium Oxide Dispersion The same procedure as in Example 1 was repeated except that the titanium oxide used was replaced with "CR-80" (rutile-type; Al/Si-treated titanium oxide; average primary particle size: 250 nm) available from Ishihara Sangyo Kaisha, Ltd., thereby obtaining a titanium oxide dispersion having an average particle size of 303 nm (solid content: 30% by mass). The thus obtained titanium oxide ($TiO_2$) dispersion was evaluated for foaming properties thereof by the following method. The results are shown in Table 3.

<Evaluation of Foaming Properties of Titanium Oxide Dispersion>

Thirty grams (30 g) of the titanium oxide dispersion were charged into a 50 mL screw vial. Then, the screw vial was laid down horizontally, and shaken by a multi-shaker "MMS-210" available from Tokyo Rikakikai Co., Ltd., at 150 rpm for 300 seconds. Immediately after the shaking, visual observation of the dispersion within the screw vial was commenced to measure the time elapsed until the dispersion was defoamed.

The foaming properties of the titanium oxide dispersion was evaluated according to the following evaluation ratings. The shorter time elapsed until the dispersion was defoamed means that the titanium oxide dispersion was more excellent in foam suppressing properties and defoaming properties, and the resulting water-based ink was more excellent in ejection stability.

(Evaluation Ratings)

◎: The time elapsed until the dispersion was defoamed was less than 5 seconds.

○: The time elapsed until the dispersion was defoamed was not less than 5 seconds and less than 10 seconds.

Δ: The time elapsed until the dispersion was defoamed was not less than 10 seconds and less than 30 seconds.

x: The time elapsed until the dispersion was defoamed was not less than 30 seconds.

(2) Production of Water-Based Ink and Evaluation of Redispersibility and Ejection Properties of Water-Based Ink The same procedure as in Example 1 was conducted using polyacrylic acid (PAA; Mw; 5000) available from Wako Pure Chemical Industries, Ltd., as a polymer dispersant to thereby obtain a water-based ink having a viscosity of 5.5 mPa·s. The resulting water-based ink was evaluated for redispersibility and ejection properties thereof by the following method. The results are shown in Table 3.

<Evaluation of Redispersibility of Water-Based Ink>

Thirty grams (30 g) of the water-based ink were charged into a 50 mL screw vial and allowed to stand therein at 70° C. for 7 days. Thereafter, the screw vial was laid down horizontally, and shaken by a multi-shaker "MMS-210" available from Tokyo Rikakikai Co., Ltd., at 150 rpm for 60 seconds. Immediately after the shaking, 2 g of the water-based ink in the screw vial was sampled from an upper liquid level thereof using a pipette. The shaking conditions used above were determined assuming that a simplified redispersing means of the ink-jet printing apparatus was operated.

Then, 1 g of the thus sampled water-based ink was diluted 2500 times with ion-exchanged water. Next, the diluted sample was subjected to the measurement of an absorbance (Abs value) thereof at a wavelength of 500 nm using a spectrophotometer "U-3010" available from Hitachi High-Tech Science Corporation. On the other hand, the absorbance value of the sample obtained by diluting the respective water-based inks immediately after production thereof 2500 times with distilled water was measured in the same manner as described above. From these measured values, the redispersion rate of the water-based ink was calculated according to the following formula.

Redispersion rate (%)=100×[(absorbance of a supernatant solution obtained after allowing the water-based ink to stand at 70° C. for 7 days and then shaking the water-based ink)/(absorbance of the water-based ink immediately after production thereof)]

The redispersibility of the water-based ink was evaluated according to the following evaluation ratings. The larger the redispersion rate becomes, the more excellent the redispersibility of the water-based ink is.

(Evaluation Ratings)

◎: Redispersion rate was not less than 97% and not more than 100%.

○: Redispersion rate was not less than 95% and less than 97%.

Δ: Redispersion rate was not less than 80% and less than 95%.

x: Redispersion rate was less than 80%.

<Evaluation of Ejection Properties of Water-Based Ink>

Using the water-based ink, images were printed onto a corona discharge-treated PET "TAIKO Polyester Film FE2001" available from Futamura Chemical Co, Ltd., by the following ink-jet printing method.

(Ink-Jet Printing Method)

Under the environmental conditions of a temperature of 25±1° C. and a relative humidity of 30±5%, the water-based ink was evaluated for ejection properties thereof using a print evaluation apparatus available from Trytech Co., Ltd., equipped with an ink-jet print head "KJ4B-HD06MHG-STDV" (piezoelectric type) available from Kyocera Corporation. A film heater of an A4 size available from KAWAI Corporation was secured to a transportation table for a printing medium so as to heat the printing medium. The operating conditions of the print evaluation apparatus were set to a head voltage of 26 V, a frequency of 20 kHz, an ejected ink droplet amount of 5 pL, a head temperature of 32° C., a resolution of 600 dpi, a number of ink shots for flashing before being ejected of 200 shots and a negative pressure of −4.0 kPa, and the printing medium was fixed on the film heater such that the longitudinal direction of the printing medium was aligned with a transporting direction thereof. Separately, 30 g of the water-based ink was previously charged into a 50 mL screw vial, and then the screw vial was laid down horizontally and shaken by a multi-shaker "MMS-210" at 150 rpm for 60 seconds. The thus previously shaken water-based ink was rapidly charged into the print evaluation apparatus. Immediately after charging the water-based ink, a printing command was transmitted to the print evaluation apparatus to print a print check pattern capable of judging whether or not the water-based ink was ejected through all of the nozzles therein, on the printing paper.

At this time, the thus obtained print check pattern was examined to count the number of missing nozzles (corresponding to the number of nozzles clogged from which no ink was normally ejected) and thereby evaluate ejection properties of the water-based ink according to the following evaluation ratings. The less the number of the nozzles clogged (missing nozzles), the more excellent the ejection properties of the water-based ink.

(Evaluation Ratings)

5: No missing nozzles were present;

4: Number of missing nozzles was from 1 to 2;

3: Number of missing nozzles was from 3 to 5;

2: Number of missing nozzles was from 6 to 10; and

1: Number of missing nozzles was not less than 11.

Example 3

(1) Production of Titanium Oxide Dispersion and Evaluation of Foaming Properties of Titanium Oxide Dispersion The same procedure as in Example 2 was repeated except that the polymer dispersant used was replaced with "Poise 530" (acrylic acid polymer; Mw: 38000; neutralization degree: 100%) available from Kao Corporation, and no 5N sodium hydroxide aqueous solution was added, thereby obtaining a titanium oxide dispersion (solid content: 30% by mass). The evaluation results of foaming properties of the thus obtained titanium oxide dispersion are shown in Table 3.

(2) Production of Water-Based Ink and Evaluation of Redispersibility and Ejection Properties of Water-Based Ink The water-based ink was obtained by the same method as used in Example 1. The results are shown in Table 3.

Example 4

(1) Production of Titanium Oxide Dispersion and Evaluation of Foaming Properties of Titanium Oxide Dispersion The same procedure as in Example 3 was repeated except that the polymer dispersant used was replaced with "Poise 520" (acrylic acid/maleic acid copolymer; Mw: 20000; neutralization degree: 100%) available from Kao Corporation, thereby obtaining a titanium oxide dispersion (solid content: 30% by mass). The evaluation results of foaming properties of the thus obtained titanium oxide dispersion are shown in Table 3.

(2) Production of Water-Based Ink and Evaluation of Redispersibility and Ejection Properties of Water-Based Ink The water-based ink was obtained by the same method as used in Example 1. The results are shown in Table 3.

Example 5

(1) Production of Titanium Oxide Dispersion and Evaluation of Foaming Properties of Titanium Oxide Dispersion The same procedure as in Example 3 was repeated except that the polymer dispersant used was replaced with "ARON 6012" (acrylic acid/acrylamide t-butylsulfonic acid copolymer; Mw: 6000; neutralization degree: 100%) available from TOAGOSEI Co., Ltd., thereby obtaining a titanium oxide dispersion (solid content: 30% by mass). The evaluation results of foaming properties of the thus obtained titanium oxide dispersion are shown in Table 3.

(2) Production of Water-Based Ink and Evaluation of Redispersibility and Ejection Properties of Water-Based Ink The water-based ink was obtained by the same method as used in Example 1. The results are shown in Table 3.

Example 6

(1) Production of Titanium Oxide Dispersion and Evaluation of Foaming Properties of Titanium Oxide Dispersion A 250 mL polyethylene bottle was charged with 0.75 g of the polymer dispersant P1, 15 g of ion-exchanged water and 15 g of titanium oxide "CR-80", and the contents of the bottle were dispersed using a bench top-type pot mill pedestal at 250 rpm for 8 hours, and the subsequent procedure was conducted in the same manner as in Example 1, thereby obtaining a titanium oxide dispersion (solid content: 30% by mass). The evaluation results of foaming properties of the thus obtained titanium oxide dispersion are shown in Table 3.

(2) Production of Water-Based Ink and Evaluation of Redispersibility and Ejection Properties of Water-Based Ink The water-based ink was obtained by the same method as used in Example 1. The results are shown in Table 3.

Example 7 and Comparative Examples 2 to 5

(1) Production and Evaluation of Titanium Oxide Dispersion

The same procedure as in Example 6 was repeated except that the polymer dispersant used was replaced with those shown in Table 3, thereby obtaining titanium oxide dispersions (solid content: 30% by mass). The evaluation results of foaming properties of the thus obtained titanium oxide dispersions are shown in Table 3.

(2) Production of Water-Based Ink and Evaluation of Redispersibility and Ejection Properties of Water-Based Ink The water-based ink was obtained by the same method as used in Example 1. The results are shown in Table 3.

Comparative Example 6

(1) Production of Titanium Oxide Dispersion and Evaluation of Foaming Properties of Titanium Oxide Dispersion The same procedure as in Example 6 was repeated except that the polymer dispersant used was replaced with "JONCRYL 70J" (J-70J; styrene/acrylic acid copolymer; Mw: 16500; acid value: 240 KOHmg/g) available from BASF, and the amount of the polymer dispersant added was changed to 1.0 g, thereby obtaining a titanium oxide dispersion (solid content: 30% by mass).

The thus obtained dispersion suffered from violent foaming during the dispersion treatment. As a result, it was considered that since a sufficient shear force was hardly applied to the dispersion, the dispersion treatment failed to well proceed, so that the resulting titanium oxide dispersion was insufficient in redispersibility. The results are shown in Table 3.

(2) Production of Water-Based Ink and Evaluation of Redispersibility and Ejection Properties of Water-Based Ink The water-based ink was obtained by the same method as used in Example 1. However, the thus obtained water-based ink had poor stability and therefore immediately suffered from precipitation, so that it was not possible to evaluate ejection properties of the water-based ink using an ink-jet printing apparatus. The evaluation results of redispersibility of the resulting water-based ink are shown in Table 3.

Comparative Example 7

(1) Production of Titanium Oxide Dispersion and Evaluation of Foaming Properties of Titanium Oxide Dispersion The same procedure as in Example 7 was repeated except that the polymer dispersant used was replaced with "JONCRYL 61J" (J-61J; styrene/acrylic acid copolymer; Mw: 12000; acid value: 195 KOHmg/g) available from BASF, and the amount of the polymer dispersant added was changed to 0.98 g, thereby obtaining a titanium oxide dispersion (solid content: 30% by mass).

The thus obtained dispersion suffered from violent foaming during the dispersion treatment. As a result, it was considered that since a sufficient shear force was hardly applied to the dispersion, the dispersion treatment failed to well proceed, so that the resulting titanium oxide dispersion was insufficient in redispersibility. The results are shown in Table 3.

(2) Production of Water-Based Ink and Evaluation of Redispersibility and Ejection Properties of Water-Based Ink The water-based ink was obtained by the same method as used in Example 1. However, the thus obtained water-based ink had poor stability and therefore immediately suffered from precipitation, so that it was not possible to evaluate ejection properties of the water-based ink using an ink-jet printing apparatus. The evaluation results of redispersibility of the resulting water-based ink are shown in Table 3.

TABLE 3

| | | Examples | | | | | |
|---|---|---|---|---|---|---|---|
| | | 2 | 3 | 4 | 5 | 6 | 7 |
| Polymer dispersant | Name (or tradename) | PAA | "Poise 530" | "Poise 520" | "ARON 6012" | P1 | P2 |
| | Amount of anionic group-containing monomer (%)*[1] | 100 | 100 | 100 | 100 | 77.0 | 90.1 |
| | Weight-average molecular weight | 5000 | 38000 | 20000 | 6000 | 27000 | 24000 |
| | Acid value (KOHmg/g) | 780 | 780 | 700 | 525 | 410 | 585 |
| | Neutralization degree (%) | 50 | 100 | 100 | 100 | 50 | 50 |

TABLE 3-continued

| | | | | | | | |
|---|---|---|---|---|---|---|---|
| $TiO_2$ dispersion | Kind of $TiO_2$ | CR-80 | CR-80 | CR-80 | CR-80 | CR-80 | CR-80 |
| | Amount of $TiO_2$ (%) | 10 | 10 | 10 | 10 | 10 | 10 |
| | Amount based on $TiO_2$ (%)*[2] | 2 | 2 | 2 | 2 | 2 | 2 |
| | Solid content (%) | 30 | 30 | 30 | 30 | 30 | 30 |
| | Average particle size of $TiO_2$ (nm) | 303 | 296 | 336 | 329 | 333 | 311 |
| | Foaming properties | ◎ | ○ | ◎ | ◎ | ○ | ○ |
| Water-based ink | Viscosity of ink (mPa·s) | 5.5 | 5.6 | 5.7 | 5.4 | 5.9 | 5.8 |
| | Redispersibility | ◎ | ◎ | ◎ | ◎ | ○ | ◎ |
| | Ejection properties | 5 | 4 | 4 | 5 | 4 | 4 |

| | | Comparative Examples | | | | | |
|---|---|---|---|---|---|---|---|
| | | 2 | 3 | 4 | 5 | 6 | 7 |
| Polymer dispersant | Name (or tradename) | P3 | P4 | P5 | P6 | "J-70J" | "J-61J" |
| | Amount of anionic group-containing monomer (%)*[1] | 70.0 | 31.8 | 42.3 | 60.0 | 30 | 25 |
| | Weight-average molecular weight | 25000 | 30000 | 20000 | 28000 | 16500 | 12000 |
| | Acid value (KOHmg/g) | 305 | 210 | 180 | 240 | 240 | 195 |
| | Neutralization degree (%) | 50 | 50 | 50 | 50 | 50 | 50 |
| $TiO_2$ dispersion | Kind of $TiO_2$ | CR-80 | CR-80 | CR-80 | CR-80 | CR-80 | CR-80 |
| | Amount of $TiO_2$ (%) | 10 | 10 | 10 | 10 | 10 | 10 |
| | Amount based on $TiO_2$ (%)*[2] | 2 | 2 | 2 | 2 | 2 | 2 |
| | Solid content (%) | 30 | 30 | 30 | 30 | 30 | 30 |
| | Average particle size of $TiO_2$ (nm) | 345 | 362 | 363 | 359 | 856 | 1200 |
| | Foaming properties | Δ | X | X | X | X | X |
| Water-based ink | Viscosity of ink (mPa·s) | 5.9 | 6.1 | 6.0 | 6.1 | 7.5 | 8.5 |
| | Redispersibility | ○ | Δ | Δ | ○ | X | X |
| | Ejection properties | 2 | 1 | 1 | 1 | Non-printable | Non-printable |

Note
*[1]Content of constitutional unit derived from anionic group-containing monomer (a) (% by mass)
*[2]Amount of polymer dispersant on the basis of titanium oxide (% by mass)

Example 8

(1) Production of Titanium Oxide Dispersion and Evaluation of Foaming Properties of Titanium Oxide Dispersion The same procedure as in Example 3 was repeated except that the amount of the polymer dispersant added was changed to 0.75 g, thereby obtaining a titanium oxide dispersion (solid content: 30% by mass). The evaluation results of foaming properties of the thus obtained titanium oxide dispersion are shown in Table 4.

(2) Production of Water-Based Ink and Evaluation of Redispersibility and Ejection Properties of Water-Based Ink The same procedure as in Example 1 was repeated except that the amounts of the titanium oxide dispersion and ion-exchanged water used therein were changed to 35.0 parts and 24.9 parts, respectively, thereby obtaining a water-based ink. The results are shown in Table 4.

Comparative Example 8

(1) Production of Titanium Oxide Dispersion and Evaluation of Foaming Properties of Titanium Oxide Dispersion The same procedure as in Example 3 was repeated except that the amount of the polymer dispersant added was changed to 1.5 g, thereby obtaining a titanium oxide dispersion (solid content: 30% by mass). The evaluation results of foaming properties of the thus obtained titanium oxide dispersion are shown in Table 4.

(2) Production of Water-Based Ink and Evaluation of Redispersibility and Ejection Properties of Water-Based Ink The same procedure as in Example 1 was repeated except that the amounts of the titanium oxide dispersion and ion-exchanged water used therein were changed to 36.7 parts and 23.2 parts, respectively, thereby obtaining a water-based ink. The results are shown together with the results of Example 3 in Table 4.

TABLE 4

Effect of Content of Dispersant

| | | Example 3 | Example 8 | Comparative Example 8 |
|---|---|---|---|---|
| Polymer dispersant | Name (or tradename) | "Poise 530" | "Poise 530" | "Poise 530" |
| | Amount of anionic group-containing monomer (%)*[1] | 100 | 100 | 100 |
| | Weight-average molecular weight | 38000 | 38000 | 38000 |
| | Acid value (KOHmg/g) | 780 | 780 | 780 |
| | Neutralization degree (%) | 100 | 100 | 100 |

TABLE 4-continued

Effect of Content of Dispersant

|  |  | Example 3 | Example 8 | Comparative Example 8 |
|---|---|---|---|---|
| TiO$_2$ dispersion | Kind of TiO$_2$ | CR-80 | CR-80 | CR-80 |
|  | Amount of TiO$_2$ (%) | 10 | 10 | 10 |
|  | Amount based on TiO$_2$ (%)*[2] | 2 | 5 | 10 |
|  | Solid content (%) | 30 | 30 | 30 |
|  | Average particle size of TiO$_2$ (nm) | 296 | 305 | 320 |
|  | Foaming properties | ○ | Δ | X |
| Water-based ink | Viscosity of ink (mPa · s) | 5.6 | 5.9 | 6.1 |
|  | Redispersibility | ◎ | Δ | X |
|  | Ejection properties | 4 | 2 | 1 |

Note
*[1]Content of constitutional unit derived from anionic group-containing monomer (a) (% by mass)
*[2]Amount of polymer dispersant on the basis of titanium oxide (% by mass)

Comparative Examples 9 and 10

(1) Production and Evaluation of Titanium Oxide Dispersion

The same procedure as in Example 6 was repeated except that the polymer dispersant used was replaced with those shown in Table 5, thereby obtaining titanium oxide dispersions (solid content: 30% by mass). The evaluation results of foaming properties of the thus obtained titanium oxide dispersions are shown in Table 5.

(2) Production of Water-Based Ink and Evaluation of Redispersibility and Ejection Properties of Water-Based Ink The water-based ink was obtained by the same method as used in Example 1. The results are shown together with the results of Example 6 in Table 5.

TABLE 5

Effect of Molecular Weight of Dispersant

|  |  | Example 6 | Comparative Example 9 | Comparative Example 10 |
|---|---|---|---|---|
| Polymer dispersant | Name (or tradename) | P1 | P7 | P8 |
|  | Amount of anionic group-containing monomer (%)*[1] | 77.0 | 77.0 | 79.9 |
|  | Weight-average molecular weight | 27000 | 60000 | 90000 |
|  | Acid value (KOHmg/g) | 410 | 410 | 410 |
|  | Neutralization degree (%) | 50 | 50 | 50 |
| TiO$_2$ dispersion | Kind of TiO$_2$ | CR-80 | CR-80 | CR-80 |
|  | Amount of TiO$_2$ (%) | 10 | 10 | 10 |
|  | Amount based on TiO$_2$ (%)*[2] | 2 | 2 | 2 |
|  | Solid content (%) | 30 | 30 | 30 |
|  | Average particle size of TiO$_2$ (nm) | 333 | 347 | 365 |
|  | Foaming properties | ○ | Δ | X |
| Water-based ink | Viscosity of ink (mPa · s) | 5.9 | 6.0 | 6.3 |
|  | Redispersibility | ○ | ○ | ○ |
|  | Ejection properties | 4 | 3 | 1 |

Note
*[1]Content of constitutional unit derived from anionic group-containing monomer (a) (% by mass)
*[2]Amount of polymer dispersant on the basis of titanium oxide (% by mass)

Example 9

(1) Production of Titanium Oxide Dispersion and Evaluation of Foaming Properties of Titanium Oxide Dispersion The same procedure as in Example 2 was repeated except that the titanium oxide used was replaced with "CR-834" (rutile-type; Al/Si/Zr-treated titanium oxide; average primary particle size: 170 nm) available from Tronox Limited, thereby obtaining a titanium oxide dispersion having an average particle size of 250 nm (solid content: 30% by mass). The evaluation results of foaming properties of the thus obtained titanium oxide dispersion are shown in Table 6.

(2) Production of Water-Based Ink and Evaluation of Redispersibility and Ejection Properties of Water-Based Ink The water-based ink was obtained by the same method as used in Example 1. The results are shown in Table 6.

Comparative Example 11

(1) Production of Titanium Oxide Dispersion and Evaluation of Foaming Properties of Titanium Oxide Dispersion The same procedure as in Example 6 was repeated except that the titanium oxide used was replaced with "MT-700HD" (rutile-type; Al/Zr-treated titanium oxide; average primary particle size: 50 nm) available from TAYCA Corporation, thereby obtaining a titanium oxide dispersion having an average particle size of 200 nm (solid content: 30% by mass). The evaluation results of foaming properties of the thus obtained titanium oxide dispersion are shown in Table 6.

(2) Production of Water-Based Ink and Evaluation of Redispersibility and Ejection Properties of Water-Based Ink The water-based ink was obtained by the same method as used in Example 1. The results are shown together with the results of Example 6 in Table 6.

TABLE 6

Effect of Average Primary Particle Size of Titanium Oxide

|  |  | Example 9 | Example 6 | Comparative Example 11 |
|---|---|---|---|---|
| Polymer dispersant | Name (or tradename) | PAA | P1 | P1 |
|  | Amount of anionic group-containing monomer (%)*[1] | 100 | 77.0 | 77.0 |

TABLE 6-continued

Effect of Average Primary Particle Size of Titanium Oxide

|  |  | Example 9 | Example 6 | Comparative Example 11 |
|---|---|---|---|---|
|  | Weight-average molecular weight | 5000 | 27000 | 27000 |
|  | Acid value (KOHmg/g) | 780 | 410 | 410 |
|  | Neutralization degree (%) | 50 | 50 | 50 |
| TiO$_2$ | Kind | CR-834 | CR-80 | MT-700HD |
|  | Average primary particle size (nm) | 170 | 250 | 50 |
| TiO$_2$ dispersion | Amount of TiO$_2$ (%) | 10 | 10 | 10 |
|  | Amount based on TiO$_2$ (%)*$^2$ | 2 | 2 | 2 |
|  | Solid content (%) | 30 | 30 | 30 |
|  | Average particle size of TiO$_2$ (nm) | 250 | 333 | 200 |
|  | Foaming properties | ◯ | ◯ | X |
| Water-based ink | Viscosity of ink (mPa·s) | 6.3 | 5.9 | 9.1 |
|  | Redispersibility | ◯ | ◯ | X |
|  | Ejection properties | 3 | 4 | 2 |

Note
*$^1$Content of constitutional unit derived from anionic group-containing monomer (a) (% by mass)
*$^2$Amount of polymer dispersant on the basis of titanium oxide (% by mass)

From Table 3, it was confirmed that the water-based inks obtained in Examples 2 to 7 in which the polymer dispersants respectively containing the constitutional unit derived from at least one anionic group-containing monomer selected from the group consisting of acrylic acid, methacrylic acid, maleic acid and a sulfonic group-containing vinyl monomer in an amount of not less than 72% by mass were used, were capable of producing the ink-jet printed materials that were excellent in redispersibility and ejection properties as compared to the water-based inks obtained in Comparative Examples 2 to 7.

From Table 4, it was confirmed that the water-based inks obtained in Examples 3 and 8 in which the content of the polymer dispersant in the respective water-based inks was not less than 1% by mass and not more than 7% by mass on the basis of the titanium oxide were excellent in redispersibility and ejection properties as compared to the water-based ink obtained in Comparative Example 8.

From Table 5, it was confirmed that the water-based ink obtained in Example 6 in which the polymer dispersant having a weight-average molecular weight of not less than 3,000 and not more than 50,000 was used was excellent in redispersibility and ejection properties as compared to the water-based inks obtained in Comparative Examples 9 and 10.

In addition, from Table 6, it was confirmed that the water-based ink obtained in Example 9 in which the average primary particle size of the titanium oxide used was 170 nm and the water-based ink obtained in Example 6 in which the average primary particle size of the titanium oxide used was 250 nm were excellent in foaming properties, redispersibility and ejection properties as compared to the water-based ink obtained in Comparative Example 11 in which the average primary particle size of the titanium oxide used was 50 nm.

INDUSTRIAL APPLICABILITY

In the ink-jet printing method according to the present invention, even though the titanium oxide is precipitated, it is possible to readily redisperse the titanium oxide in the water-based ink by simple stirring operations. Therefore, the ink-jet printing method according to the present invention is effective to attain good ejection properties of the ink.

In addition, the water-based ink for ink-jet printing according to the present invention has good hiding power, and even though the rutile-type titanium oxide used therein is precipitated, it is possible to readily redisperse the titanium oxide in the water-based ink by simple stirring operations, and further the properties of the water-based ink can be rapidly restored owing to excellent foam suppressing properties and defoaming properties thereof.

REFERENCE SIGNS LIST

1: Ink ejection means
2: Ink container
3: Ink flow path
4: Stirring mechanism
5: Printing medium

The invention claimed is:

1. An ink-jet printing method of printing characters or images with a water-based ink comprising a rutile-type titanium oxide having an average particle size of not less than 150 nm and not more than 1000 and a polymer dispersant using an ink-jet printing apparatus, in which the polymer dispersant comprises a constitutional unit derived from at least one anionic group-containing monomer selected from the group consisting of acrylic acid, methacrylic acid, maleic acid and a sulfonic group-containing vinyl monomer in an amount of not less than 72% by mass;
   a weight-average molecular weight of the polymer dispersant is not less than 3,000 and not more than 50,000;
   a content of the polymer dispersant in the water-based ink is not less than 1% by mass and not more than 7% by mass on the basis of the titanium oxide; and
   the ink-jet printing apparatus is equipped with a dispersing means for dispersing the titanium oxide in the water-based ink,
   said method comprising the following steps 1 and 2:
   Step 1: redispersing the water-based ink by the dispersing means; and
   Step 2: ejecting the water-based ink redispersed in the step 1 onto a printing medium to print characters or images on the printing medium;
   wherein an acid value of the polymer dispersant is not less than 350 mgKOH/g and not more than 1000 mgKOH/g, and
   wherein an average primary particle size of the rutile-type titanium oxide is not less than 100 nm and not more than 600 nm.

2. The ink-jet printing method according to claim 1, wherein the anionic group-containing monomer is at least one monomer selected from the group consisting of acrylic acid, methacrylic acid and styrenesulfonic acid.

3. The ink-jet printing method according to claim 1, wherein a viscosity of the water-based ink as measured at 32° C. is not less than 4.0 mPa·s and not more than 12.0 mPa·s.

4. The ink-jet printing method according to claim 1, wherein a content of the rutile-type titanium oxide in the water-based ink is not less than 3.0% by mass and not more than 20% by mass.

5. The ink-jet printing method according to claim 1, wherein the titanium oxide is a titanium oxide subjected to surface treatment with alumina or with alumina and silica.

6. The ink-jet printing method according to claim 1, wherein the water-based ink further comprises an organic solvent, and a content of the organic solvent in the water-based ink is not more than 45% by mass.

7. The ink-jet printing method according to claim 1, wherein a content of water in the water-based ink is not less than 30% by mass and not more than 70% by mass.

8. The ink-jet printing method according to claim 1, wherein the dispersing means is at least one mechanism selected from the group consisting of a stirring mechanism for stirring the water-based ink within an ink container, a shaking mechanism, a vibration-applying mechanism and a circulating mechanism for circulating the water-based ink.

9. The ink-jet printing method according to claim 1, wherein the printing medium is a resin film.

10. The ink-jet printing method according to claim 1, wherein the water-based ink further comprises a surfactant.

11. The ink-jet printing method according to claim 1, wherein a content of the polymer dispersant in the water-based ink is not less than 1.3% by mass and not more than 6.5% by mass on the basis of the titanium oxide.

12. The ink jet printing method according to claim 1, wherein an acid value of the polymer dispersant is not less than 450 mgKOH/g and not more than 900 mgKOH/g.

13. The ink-jet printing method according to claim 1, wherein the printing medium is at least one film selected from the group consisting of a polyester film and a stretched polypropylene film.

14. The ink-jet printing method according to claim 6, wherein the organic solvent is at least one compound selected from the group consisting of polyhydric alcohol and glycol ether.

15. The ink-jet printing method according to claim 1, wherein the polymer dispersant is in the form of a polymer comprising the constitutional unit derived from the anionic group-containing monomer and a constitutional unit derived from a nonionic monomer.

16. The ink-jet printing method according to claim 15, wherein the anionic group-containing monomer as the constitutional unit of the polymer dispersant is at least one a sodium salt or a potassium salt of monomer selected from the group consisting of acrylic acid, methacrylic acid, maleic acid and a sulfonic group-containing vinyl monomer.

17. A water-based ink for ink-jet printing comprising a rutile-type titanium oxide and a polymer dispersant, in which the polymer dispersant comprises a constitutional unit derived from at least one anionic group-containing monomer selected from the group consisting of acrylic acid, methacrylic acid, maleic acid and a sulfonic group-containing vinyl monomer in an amount of not less than 72% by mass and wherein an acid value of the polymer dispersant is not less than 350 mgKOH/g and not more than 1000 mgKOH/g;
an average primary particle size of the rutile-type titanium oxide is not less than 100 nm and not more than 600 nm and an average particle size of the particles in the titanium oxide dispersion is not less than 150 nm and not more than 1000 nm;
a weight-average molecular weight of the polymer dispersant is not less than 3,000 and not more than 50,000;
a content of the polymer dispersant in the water-based ink is not less than 1% by mass and not more than 7% by mass on the basis of the titanium oxide; and
a viscosity of the water-based ink as measured at 32° C. is not less than 4.0 mPa*s and not more than 12.0 mPa*s.

* * * * *